US012316055B2

(12) United States Patent
Pepe et al.

(10) Patent No.: US 12,316,055 B2
(45) Date of Patent: May 27, 2025

(54) COUPLERS FOR SINGLE PAIR CONNECTORS

(71) Applicant: COMMSCOPE TECHNOLOGIES LLC, Hickory, NC (US)

(72) Inventors: Paul John Pepe, Clemmons, NC (US); Shawn Phillip Tobey, Trinity, NC (US)

(73) Assignee: CommScope Technologies LLC, Claremont, NC (US)

( * ) Notice: Subject to any disclaimer, the term of this patent is extended or adjusted under 35 U.S.C. 154(b) by 379 days.

(21) Appl. No.: 17/765,125

(22) PCT Filed: Sep. 29, 2020

(86) PCT No.: PCT/US2020/053283
§ 371 (c)(1),
(2) Date: Mar. 30, 2022

(87) PCT Pub. No.: WO2021/067274
PCT Pub. Date: Apr. 8, 2021

(65) Prior Publication Data

US 2022/0360033 A1 Nov. 10, 2022

Related U.S. Application Data

(60) Provisional application No. 62/908,330, filed on Sep. 30, 2019.

(51) Int. Cl.
*H01R 31/06* (2006.01)
*H01R 13/04* (2006.01)
(Continued)

(52) U.S. Cl.
CPC ............ *H01R 31/06* (2013.01); *H01R 13/04* (2013.01); *H01R 13/6583* (2013.01);
(Continued)

(58) Field of Classification Search
CPC ........ H01R 31/06; H01R 24/20; H01R 13/04; H01R 13/6583; H01R 13/6585; H01R 13/518; H01R 43/26; H01R 2103/00
See application file for complete search history.

(56) References Cited

U.S. PATENT DOCUMENTS 2,673,968 A 3/1954 Smith
2,813,257 A 11/1957 Cornell, Jr.
(Continued)

FOREIGN PATENT DOCUMENTS

CN 1408135 A 4/2003
CN 1977428 A 6/2007
(Continued)

OTHER PUBLICATIONS

Bapat, "On the design and analysis of compliant mechanisms using the pseudo-rigid-body model concept." Retrieved from the Internet: <https://scholarsmine.mst.edu/cgi/viewcontent.cgi?article=3378&context=doctoral_dissertations>. Doctoral Dissertation, Missouri University of Science and Technology, 295 pages (2015).
(Continued)

*Primary Examiner* — Harshad C Patel
(74) *Attorney, Agent, or Firm* — Merchant & Gould P.C.

(57) ABSTRACT

A coupler couples a first connector with a second connector wherein each of the connectors is coupled to exactly two electrical conductors. Each coupler can be utilized in a shielded (e.g., metal) or non-shielded (e.g. non-metal) form as appropriate to a specific application. Each coupler includes exactly one pair of pin contacts, preferably with a square or rectangular cross-section. Each end of the pin contacts includes four tapered faces that join at a flattened apex and are configured to be received by the tuning fork contact of the connector. The pair of pin contacts are offset from one another and cross one another within the coupler to maintain electrical polarity as electricity travels from the
(Continued)

tuning fork contacts of a first connector to the pin contacts of the coupler and onward to the tuning fork contacts of a second connector.

20 Claims, 22 Drawing Sheets

(51) Int. Cl.
*H01R 13/6583* (2011.01)
*H01R 13/6585* (2011.01)
*H01R 24/20* (2011.01)
*H01R 43/26* (2006.01)
*H01R 13/518* (2006.01)
*H01R 103/00* (2006.01)

(52) U.S. Cl.
CPC ......... *H01R 13/6585* (2013.01); *H01R 24/20* (2013.01); *H01R 43/26* (2013.01); *H01R 13/518* (2013.01); *H01R 2103/00* (2013.01)

(56) References Cited

U.S. PATENT DOCUMENTS 3,199,060 A 8/1965 Marasco
3,827,007 A 7/1974 Fairbairn et al.
3,828,706 A 8/1974 Scott
4,054,350 A 10/1977 Hardesty
4,449,767 A 5/1984 Weidler
4,458,971 A 7/1984 D'Urso et al.
4,565,416 A 1/1986 Rudy et al.
4,702,538 A 10/1987 Hutter et al.
4,743,208 A 5/1988 Weisenburger
4,744,774 A 5/1988 Pauza
4,824,394 A 4/1989 Roath et al.
4,917,625 A 4/1990 Haile
4,932,906 A 6/1990 Kaley et al.
5,013,255 A 5/1991 Juret et al.
5,014,407 A 5/1991 Boughten et al.
5,240,436 A 8/1993 Bradley et al.
5,317,663 A * 5/1994 Beard .................. G02B 6/3825 385/70
5,368,499 A 11/1994 Hirt
5,385,476 A 1/1995 Jasper
5,496,184 A 3/1996 Garrett et al.
5,504,654 A 4/1996 Knox et al.
5,533,915 A 7/1996 Deans
5,580,264 A 12/1996 Aoyama et al.
5,647,119 A 7/1997 Bourbeau et al.
5,692,080 A * 11/1997 Lu ........................ G02B 6/3893 385/60
5,732,174 A * 3/1998 Carpenter ............ G02B 6/3809 385/60
5,748,819 A 5/1998 Szentesi et al.
5,749,755 A 5/1998 Genta et al.
5,833,496 A 11/1998 Hollander et al.
5,897,404 A 4/1999 Goodman et al.
5,915,989 A 6/1999 Adriaenssens et al.
5,984,703 A 11/1999 Weingartner
5,989,057 A 11/1999 Gerke et al.
6,019,521 A 2/2000 Manning et al.
6,045,389 A 4/2000 Ferrill et al.
6,050,845 A 4/2000 Smalley, Jr. et al.
6,065,994 A 5/2000 Hashim et al.
6,135,804 A 10/2000 Lux
6,217,230 B1 4/2001 Matsushita
6,254,440 B1 7/2001 Ko et al.
6,270,372 B1 8/2001 Jenner et al.
6,272,738 B1 8/2001 Holliday et al.
6,280,230 B1 8/2001 Takase et al.
6,305,950 B1 10/2001 Doorhy
6,371,793 B1 4/2002 Doorhy et al.
6,390,687 B1 5/2002 Shirakawa
6,402,571 B1 6/2002 Muller et al.
6,410,845 B2 6/2002 Reede
6,488,550 B1 12/2002 Kikuchi et al.
6,499,889 B1 12/2002 Shirakawa et al.
6,568,967 B2 5/2003 Inaba et al.
6,572,276 B1 6/2003 Theis et al.
6,641,431 B2 11/2003 Saitoh
6,648,673 B2 11/2003 Watanabe
6,702,617 B1 3/2004 Clement et al.
6,729,901 B2 5/2004 Aekins
6,805,577 B2 10/2004 Murakami et al.
6,988,914 B2 1/2006 Pepe et al.
7,004,797 B2 2/2006 Harada et al.
7,118,423 B2 * 10/2006 Kobayashi ........... H01R 31/085 439/682
7,131,864 B2 11/2006 Peng
7,153,156 B1 12/2006 Malstrom
7,201,601 B2 4/2007 Lappohn
7,217,162 B2 5/2007 Harada et al.
7,278,854 B1 10/2007 Robinette et al.
7,291,046 B2 11/2007 Russelburg
7,294,024 B2 11/2007 Hammond, Jr. et al.
7,297,025 B2 11/2007 Wei
7,318,272 B1 1/2008 Steiner et al.
7,325,976 B2 2/2008 Gurreri et al.
7,537,393 B2 5/2009 Anderson et al.
7,559,789 B2 7/2009 Hashim
7,618,262 B2 11/2009 Fogg et al.
7,618,297 B2 11/2009 Wang
7,690,941 B2 4/2010 Caveney et al.
7,867,033 B2 1/2011 Kumagai et al.
7,909,622 B2 3/2011 Pepe et al.
7,955,112 B2 6/2011 Yang et al.
8,006,372 B2 8/2011 Caveney et al.
8,052,482 B1 11/2011 Lin
8,109,789 B2 2/2012 Tyler
8,113,889 B2 2/2012 Zhang et al.
8,172,468 B2 5/2012 Jones et al.
8,303,337 B2 11/2012 Ballard et al.
8,382,382 B2 2/2013 Nelson
8,454,378 B2 * 6/2013 Osterhart ............... H01R 24/84 439/284
8,684,763 B2 4/2014 Mattson et al.
8,690,596 B2 4/2014 Su et al.
8,715,016 B2 5/2014 DeBock et al.
8,757,895 B2 6/2014 Petersen
8,821,031 B2 9/2014 Lin et al.
8,839,506 B2 9/2014 Slater et al.
8,840,424 B2 9/2014 Kudo
8,888,535 B2 * 11/2014 Knight ............... H01R 13/5221 439/650
8,911,260 B2 12/2014 Golko et al.
8,915,759 B2 12/2014 Miyamoto
8,952,703 B2 2/2015 Font Aranega et al.
8,979,572 B2 3/2015 Mochizuki
8,979,574 B2 3/2015 Daily, Jr. et al.
8,987,933 B2 3/2015 Yu
9,077,106 B2 * 7/2015 Suzuki ............. H01R 13/62938
9,093,807 B2 7/2015 O'Connor et al.
9,112,293 B2 * 8/2015 Suzuki ............... H01R 13/4223
9,136,652 B2 9/2015 Ngo
9,172,169 B2 10/2015 Hagio et al.
9,209,578 B2 12/2015 Mochizuki
9,293,877 B2 3/2016 Wong et al.
9,306,313 B2 * 4/2016 Heggemann ........... H01R 13/40
9,343,822 B2 5/2016 Sparrowhawk et al.
9,356,439 B2 5/2016 Keith et al.
9,366,829 B2 * 6/2016 Czosnowski ........ G02B 6/3879
9,490,591 B2 11/2016 Yamashita et al.
9,590,339 B2 3/2017 Oberski et al.
9,599,776 B2 3/2017 Shimakawa
9,634,417 B2 4/2017 Ramanna et al.
9,685,726 B2 6/2017 Ang et al.
9,692,161 B2 6/2017 Lindkamp et al.
9,799,981 B2 10/2017 Weber
9,853,388 B2 12/2017 Copper et al.
9,917,390 B1 3/2018 Bianca et al.
9,972,932 B2 5/2018 Copper et al.
10,061,090 B2 8/2018 Coenegracht
10,069,269 B2 9/2018 Takahashi

(56) References Cited

U.S. PATENT DOCUMENTS

| | | | |
|---|---|---|---|
| 10,164,383 B2 | 12/2018 | Feng | |
| 10,389,062 B2 | 8/2019 | Zebhauser et al. | |
| 10,403,996 B2 | 9/2019 | Pan et al. | |
| 10,411,409 B2 | 9/2019 | Hashim et al. | |
| 10,502,904 B2 | 12/2019 | Yang | |
| 10,535,969 B2 | 1/2020 | Sutter | |
| 10,665,974 B2 | 5/2020 | Oberski et al. | |
| 10,665,985 B2 | 5/2020 | Keith et al. | |
| 10,727,626 B2 | 7/2020 | Murray | |
| 10,768,374 B2 * | 9/2020 | Gurreri ................ | G02B 6/3869 |
| 10,950,962 B2 | 3/2021 | Schmidbauer et al. | |
| 10,998,685 B2 | 5/2021 | Curtis et al. | |
| 11,031,719 B2 | 6/2021 | Somanathapura Ramanna | |
| 11,271,350 B2 | 3/2022 | Moffitt et al. | |
| 11,296,463 B2 | 4/2022 | Keith et al. | |
| 11,362,463 B2 * | 6/2022 | Tobey .................. | H01R 4/2433 |
| 11,394,132 B2 | 7/2022 | Ohfuku et al. | |
| 11,652,319 B2 | 5/2023 | Pepe et al. | |
| 11,652,322 B2 | 5/2023 | Keith et al. | |
| 2001/0018287 A1 | 8/2001 | Reichle | |
| 2002/0055294 A1 | 5/2002 | Murakami et al. | |
| 2002/0072275 A1 | 6/2002 | Arai | |
| 2003/0017740 A1 | 1/2003 | Watanabe | |
| 2004/0152360 A1 | 8/2004 | Harris et al. | |
| 2004/0266255 A1 | 12/2004 | Lee | |
| 2005/0227545 A1 | 10/2005 | Lahoreau et al. | |
| 2005/0232566 A1 | 10/2005 | Rapp et al. | |
| 2005/0277335 A1 | 12/2005 | Gordon et al. | |
| 2006/0134966 A1 | 6/2006 | Lappohn | |
| 2006/0189215 A1 | 8/2006 | Ellis et al. | |
| 2007/0270043 A1 | 11/2007 | Pepe et al. | |
| 2007/0287332 A1 | 12/2007 | Gordon et al. | |
| 2008/0057793 A1 | 3/2008 | Gerber et al. | |
| 2008/0183359 A1 | 8/2008 | Gerber et al. | |
| 2009/0149061 A1 | 6/2009 | Zhang | |
| 2009/0176415 A1 | 7/2009 | AbuGhazaleh et al. | |
| 2009/0269954 A1 | 10/2009 | Loch et al. | |
| 2010/0003863 A1 | 1/2010 | Siemon et al. | |
| 2010/0035454 A1 | 2/2010 | Morgan et al. | |
| 2010/0040332 A1 | 2/2010 | Van Den Meersschaut et al. | |
| 2010/0041273 A1 | 2/2010 | Scherer et al. | |
| 2010/0071202 A1 | 3/2010 | Peng et al. | |
| 2010/0120284 A1 | 5/2010 | Oka et al. | |
| 2010/0173528 A1 | 7/2010 | Martich et al. | |
| 2010/0221951 A1 | 9/2010 | Pepe et al. | |
| 2010/0304600 A1 | 12/2010 | Busse | |
| 2010/0319963 A1 | 12/2010 | James et al. | |
| 2011/0097942 A1 | 4/2011 | Dooley et al. | |
| 2011/0143602 A1 | 6/2011 | Niitsu | |
| 2011/0286702 A1 | 11/2011 | Nielson et al. | |
| 2011/0294342 A1 | 12/2011 | DeBock et al. | |
| 2012/0004655 A1 | 1/2012 | Kim et al. | |
| 2012/0204417 A1 | 8/2012 | Stull | |
| 2013/0075149 A1 | 3/2013 | Golko et al. | |
| 2013/0090014 A1 | 4/2013 | Champion | |
| 2013/0171885 A1 | 7/2013 | Zhang | |
| 2013/0189873 A1 | 7/2013 | Maranto et al. | |
| 2013/0252469 A1 | 9/2013 | Mochizuki | |
| 2013/0252483 A1 | 9/2013 | Mochizuki | |
| 2013/0286896 A1 | 10/2013 | Selph et al. | |
| 2014/0038462 A1 | 2/2014 | Coffey et al. | |
| 2014/0094059 A1 | 4/2014 | Pepe et al. | |
| 2014/0213119 A1 | 7/2014 | Thackston et al. | |
| 2015/0083455 A1 | 3/2015 | Keith et al. | |
| 2015/0144395 A1 | 5/2015 | Tanaka | |
| 2015/0155670 A1 | 6/2015 | Gardner | |
| 2015/0207254 A1 | 7/2015 | Kamei et al. | |
| 2015/0214667 A1 | 7/2015 | Chen et al. | |
| 2015/0249295 A1 | 9/2015 | Tseng | |
| 2016/0028198 A1 | 1/2016 | Yamashita et al. | |
| 2016/0093984 A1 | 3/2016 | Iwamoto | |
| 2016/0131858 A1 | 5/2016 | Anderson et al. | |
| 2016/0141790 A1 | 5/2016 | Martin et al. | |
| 2016/0164223 A1 | 6/2016 | Zebhauser et al. | |
| 2016/0192527 A1 | 6/2016 | Anderson et al. | |
| 2016/0294111 A1 | 10/2016 | Kobayashi et al. | |
| 2016/0315436 A1 | 10/2016 | Plamondon et al. | |
| 2016/0344139 A1 | 11/2016 | O'Young et al. | |
| 2017/0077966 A1 | 3/2017 | Chen et al. | |
| 2017/0184798 A1 | 6/2017 | Coenegracht | |
| 2017/0207561 A1 | 7/2017 | Scherer et al. | |
| 2017/0264025 A1 | 9/2017 | Lappöhn | |
| 2017/0373405 A1 | 12/2017 | Lappoehn | |
| 2018/0287312 A1 | 10/2018 | Martin et al. | |
| 2018/0358739 A1 | 12/2018 | Martin | |
| 2019/0154923 A1 | 5/2019 | Flaig | |
| 2019/0296491 A1 | 9/2019 | Maesoba et al. | |
| 2020/0036130 A1 | 1/2020 | Fontaine et al. | |
| 2020/0106216 A1 | 4/2020 | Hashim et al. | |
| 2020/0153174 A1 | 5/2020 | Curtis et al. | |
| 2020/0274273 A1 | 8/2020 | Oberski et al. | |
| 2020/0350730 A1 | 11/2020 | Keith et al. | |
| 2021/0083441 A1 | 3/2021 | Moffitt et al. | |
| 2021/0104842 A1 | 4/2021 | Keith et al. | |
| 2021/0104843 A1 | 4/2021 | Tobey et al. | |
| 2021/0151905 A1 | 5/2021 | Novak et al. | |
| 2021/0194179 A1 | 6/2021 | Pepe et al. | |
| 2021/0378834 A1 | 12/2021 | Kleiner | |
| 2022/0158389 A1 | 5/2022 | Pepe et al. | |
| 2022/0278476 A1 | 9/2022 | Pepe et al. | |
| 2022/0384984 A1 | 12/2022 | Pepe et al. | |
| 2023/0071501 A1 | 3/2023 | Tobey et al. | |
| 2023/0238757 A1 | 7/2023 | Pepe et al. | |

FOREIGN PATENT DOCUMENTS

| | | | |
|---|---|---|---|
| CN | 102055115 | A | 5/2011 |
| CN | 102136649 | A | 7/2011 |
| CN | 103311746 | A | 9/2013 |
| CN | 104428958 | A | 3/2015 |
| CN | 105789965 | A | 7/2016 |
| CN | 106415944 | A | 2/2017 |
| CN | 107104329 | A | 8/2017 |
| CN | 209167592 | U | 7/2019 |
| DE | 10216915 | A1 | 10/2003 |
| EP | 1 128 494 | A2 | 8/2001 |
| EP | 1 783 871 | A1 | 5/2007 |
| EP | 1988611 | B1 | 8/2010 |
| EP | 2862364 | B1 | 5/2016 |
| EP | 3 091 614 | A1 | 11/2016 |
| FR | 2 290 136 | A7 | 5/1976 |
| GB | 628 419 | A | 8/1949 |
| GB | 2510490 | A | 8/2014 |
| JP | 2000-67979 | A | 3/2000 |
| JP | 4514356 | B2 | 5/2010 |
| JP | 2014-38847 | A | 2/2014 |
| KR | 10-2010-0122766 | A | 11/2010 |
| KR | 10-2011-0020262 | A | 3/2011 |
| WO | 2006/048867 | A1 | 5/2006 |
| WO | 2006/138301 | A2 | 12/2006 |
| WO | 2011/163260 | A1 | 12/2011 |
| WO | 2015/058345 | A1 | 4/2015 |
| WO | 2016/132855 | A1 | 8/2016 |
| WO | 2017/019370 | A1 | 2/2017 |
| WO | 2017/152108 | A1 | 9/2017 |
| WO | 2018/200528 | A1 | 11/2018 |
| WO | 2018/227057 | A1 | 12/2018 |
| WO | 2018/236875 | A1 | 12/2018 |
| WO | 2019/147774 | A1 | 8/2019 |
| WO | 2019/165466 | A1 | 8/2019 |
| WO | 2019/180640 | A1 | 9/2019 |
| WO | 2020/051340 | A1 | 3/2020 |
| WO | 2020/190758 | A1 | 9/2020 |
| WO | 2021/252938 | A1 | 12/2021 |
| WO | 2022/006544 | A1 | 1/2022 |
| WO | 2022/006549 | A1 | 1/2022 |

OTHER PUBLICATIONS

Her, "Methodology for Compliant Mechanisms Design" Thesis, Purdue University, 196 pages (Dec. 1986).

Koli, "A generalized approach for compliant mechanism design using the synthesis with compliance method, with experimental

(56) References Cited

OTHER PUBLICATIONS validation." Retrieved from the Internet: <URL: https://scholarsmine.mst.edu/cgi/viewcontent.cgi?article=8098&context=masters_theses>. Masters Thesis, Missouri University of Science and Technology, 155 pages (2013).
International Search Report and Written Opinion of the International Searching Authority for International Patent Application No. PCT/US2020/053283 mailed Jan. 29, 2021, 10 pages.
Extended European Search Report for Application No. 20871999.7 mailed Sep. 29, 2023.
DiBiaso et al., "Designing a Connection System for Gigabit Automotive Ethernet," SAE International Journal of Passenger Cars—Electronic and Electrical Systems, vol. 9, No. 1, pp. 134-146 (May 2016).
2-Pin Connector w/Header, 10", All Electronics Corporation, 3 pages, downloaded: http://www.allelctronics.com/item/con-242/2-pin-connector-w/header-.10/html (May 31, 2017).
2 Pin Connectors, Wiring Specialties, 5 pages (May 31, 2017).

* cited by examiner

COUPLERS FOR SINGLE PAIR CONNECTORS

CROSS-REFERENCE TO RELATED APPLICATION

This application is a National Stage Application of PCT/US2020/053283, filed on Sep. 29, 2020, which claims the benefit of U.S. Patent Application Ser. No. 62/908,330, filed on Sep. 30, 2019, the disclosures of which are incorporated herein by reference in their entireties. To the extent appropriate, a claim of priority is made to each of the above disclosed applications.

TECHNICAL FIELD

The present disclosure is directed to couplers and, more specifically, to couplers that electrically couple pairs of connectors with each connector coupled to a singled twisted pair of conductors.

BACKGROUND

A single twisted pair of conductors can be used to transmit data and/or power over a communications network that includes, for example, computers, servers, cameras, televisions, and other electronic devices including those on the internet of things (IoT), etc. In the past, this has been performed through use of Ethernet cables and connectors that typically include four pairs of conductors that are used to transmit four differential signals. Differential signaling techniques, where each signal is transmitted over a balanced pair of conductors, are used because differential signals may be affected less by external noise sources and internal noises sources such as crosstalk as compared to signals that are transmitted over unbalanced conductors.

In Ethernet cables, the insulated conductors of each differential pair are tightly twisted about each other to form four twisted pairs of conductors, and these four twisted pairs may be further twisted about each other in a so-called "core twist." A separator may be provided that is used to separate (and hence reduce coupling between) at least one of the twisted pairs from at least one other of the twisted pairs. The four twisted pairs and any separator may be enclosed in a protective jacket. Ethernet cables are connectorized with Ethernet connectors; a single Ethernet connector is configured to accommodate all four twisted pairs of conductors. However, it is possible that data and/or power transfer can be effectively supported through a singled twisted pair of conductors with its own more compact connector and cable. Couplers that can enable electrical coupling of connectors, with each connector coupled to a single pair of electrical conductors, are an important element in broadening the use of data and/or power transfer over a single pair of electrical conductors.

SUMMARY

A coupler of the present disclosure couples a first free connector with a second free connector wherein each of the free connectors is coupled to exactly two electrical conductors. Each coupler can be utilized in a shielded (e.g., metal) or non-shielded (e.g. non-metal) form as appropriate to a specific application. Each coupler includes exactly one pair of pin contacts, preferably with a square or rectangular cross-section. Each end of the pin contacts includes four tapered faces that join at a flattened apex and are configured to be received by the tuning fork contact of the free connector. The pair of pin contacts are offset from one another and cross one another within the coupler to maintain electrical polarity as electricity travels from the tuning fork contacts of a first free connector to the pin contacts of the coupler and onward to the tuning fork contacts of a second free connector.

In certain aspects, the present disclosure is directed to a coupler that includes a metal housing and exactly one pair of coupling contacts. The metal housing includes a first end that receives a first free connector and a second end that receives a second free connector. The one pair of coupling contacts are contained within the metal housing and comprise a first coupling contact and a second coupling contact. The first and second coupling contacts couple the first free connector the second free connector while maintaining electrical polarity.

Another aspect of the present disclosure is directed to a method of coupling a first free connector having exactly two electrical tuning fork contacts to a second free connector having exactly two electrical tuning fork contacts. The method includes removably receiving the first free connector in a first end of a coupler and removably receiving the second free connector in a second end of the coupler. The coupler houses exactly one pair of coupling contacts comprising a first coupling contact having first and second pin ends and a second coupling contact having first and second pin ends. The method further comprises electrically coupling the first pin ends of the first and second coupling contacts to the exactly two tuning fork contacts, respectively, of the first free connector and electrically coupling the second pin ends of the first and second coupling contacts to the exactly two tuning fork contacts, respective, of the second free connector, while maintaining electrical polarity between the first and second free connectors.

Still another aspect of the present disclosure is directed to a method of manufacturing a shielded coupler. The method includes manufacturing a metal housing having a central channel, which extends an entire length of the housing, as well as first and second ends that open to the central channel; each of the first and second ends is configured to mechanically interface, respectively, with a first free connector and a second free connector. The method further includes inserting a contact support structure within the metal housing to centrally position a center portion of each of exactly one pair of coupling contacts within the central channel; the centrally positioned pair of coupling contacts present first end pin contacts proximate the first end opening of the metal housing and second end pin contacts proximate the second end opening of the metal housing.

In certain aspects, the present disclosure is directed to a coupler that includes a housing and a contact sub-assembly. The housing includes a channel having openings at a first and a second end of the housing. The first and second end receive first and second connectors, respectively, and the first and second connectors include a first pair of contacts and a second pair of contacts, respectively. The contact sub-assembly includes exactly one pair of coupler contacts and a body portion supporting the exactly one pair of contacts. The contact sub-assembly is positioned centrally within the housing and the exactly one pair of coupler contacts electrically couple the first pair of contacts to the second pair of contacts.

In certain aspects, the present disclosure is directed to a method of manufacturing a coupler includes progressively die stamping a pair of pin contacts from a conductive material supported by a carrier strip. While the pair of pin contacts remain supported by the carriers, the method further includes overmolding a center point of the pair of pin contact to produce a contact sub-assembly having a body portion and exactly one pair of pin contacts, which is subsequently removed from the carrier strip. The method further includes die casting a coupler housing a having a channel between first and second open ends. Each of the first and second open ends have a configuration suitable to receive respective first and second connectors with each of the first and second connectors having exactly one pair of receptacle contacts. The method further includes inserting the contact sub-assembly through one of the first and second ends to a central position within the channel until the contact sub-assembly retainingly interfaces with the housing and the pair of pin contacts are positioned to interface with the respective receptacle contacts of the first and second connectors.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

A coupler of the present disclosure couples a first free connector with a second free connector wherein each of the free connectors is coupled to exactly two electrical conductors. Each coupler can be utilized in a shielded (e.g., metal) or non-shielded (e.g. non-metal) form as appropriate to a specific application. Each coupler includes exactly one pair of pin contacts, preferably with a square or rectangular cross-section. Each end of the pin contacts includes four tapered faces that join at a flattened apex and are configured to be received by the tuning fork contact of the free connector. The pair of pin contacts are offset from one another and cross one another within the coupler to maintain electrical polarity as electricity travels from the tuning fork contacts of a first free connector to the pin contacts of the coupler and onward to the tuning fork contacts of a second free connector.

In certain embodiments, the coupler includes a metal shield that houses a first housing and a second housing. The first and second housing are configured to centrally interface with one another within the coupler with the pair of pin contact spanning the first and second housings. In other embodiments, the coupler includes a singular metal housing incorporating four bonding contacts as well as a contact sub-assembly. The contact sub-assembly includes a block overmolding the pin contacts that is positioned centrally within the housing. Other embodiments and combinations of embodiments are also possible.

Figure 1A:
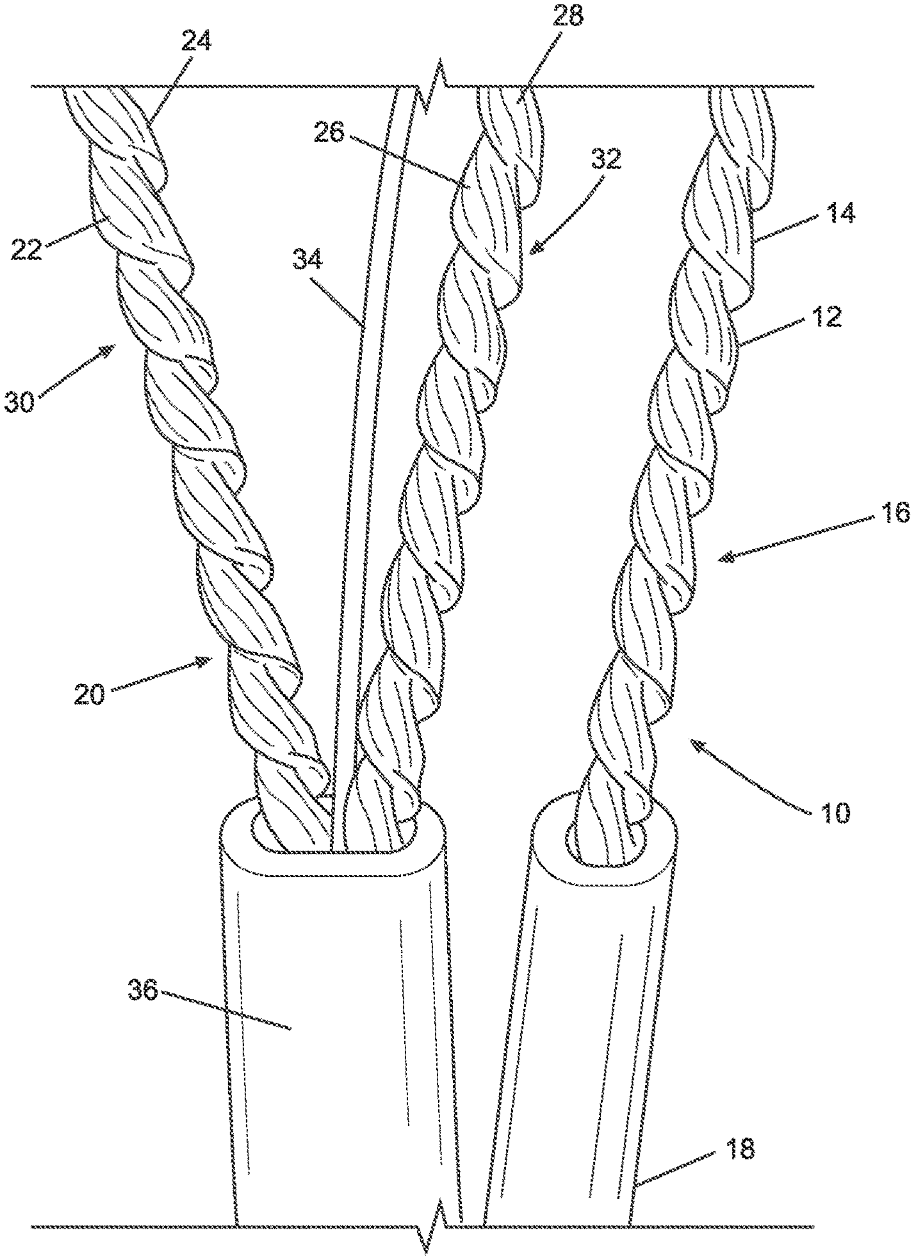
FIGS. 1A-1B illustrate example embodiments of cables having single twisted pairs of conductors.
Figure 1B:
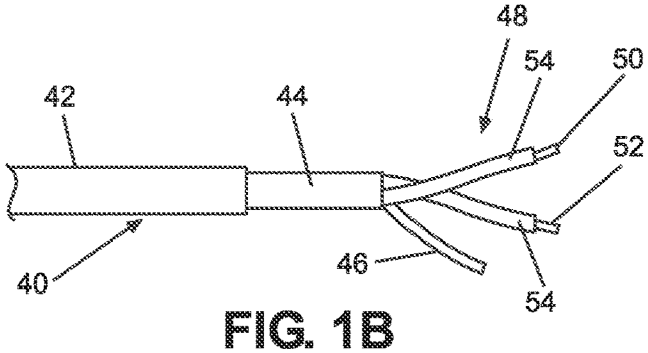
Figures 2A, 2B:
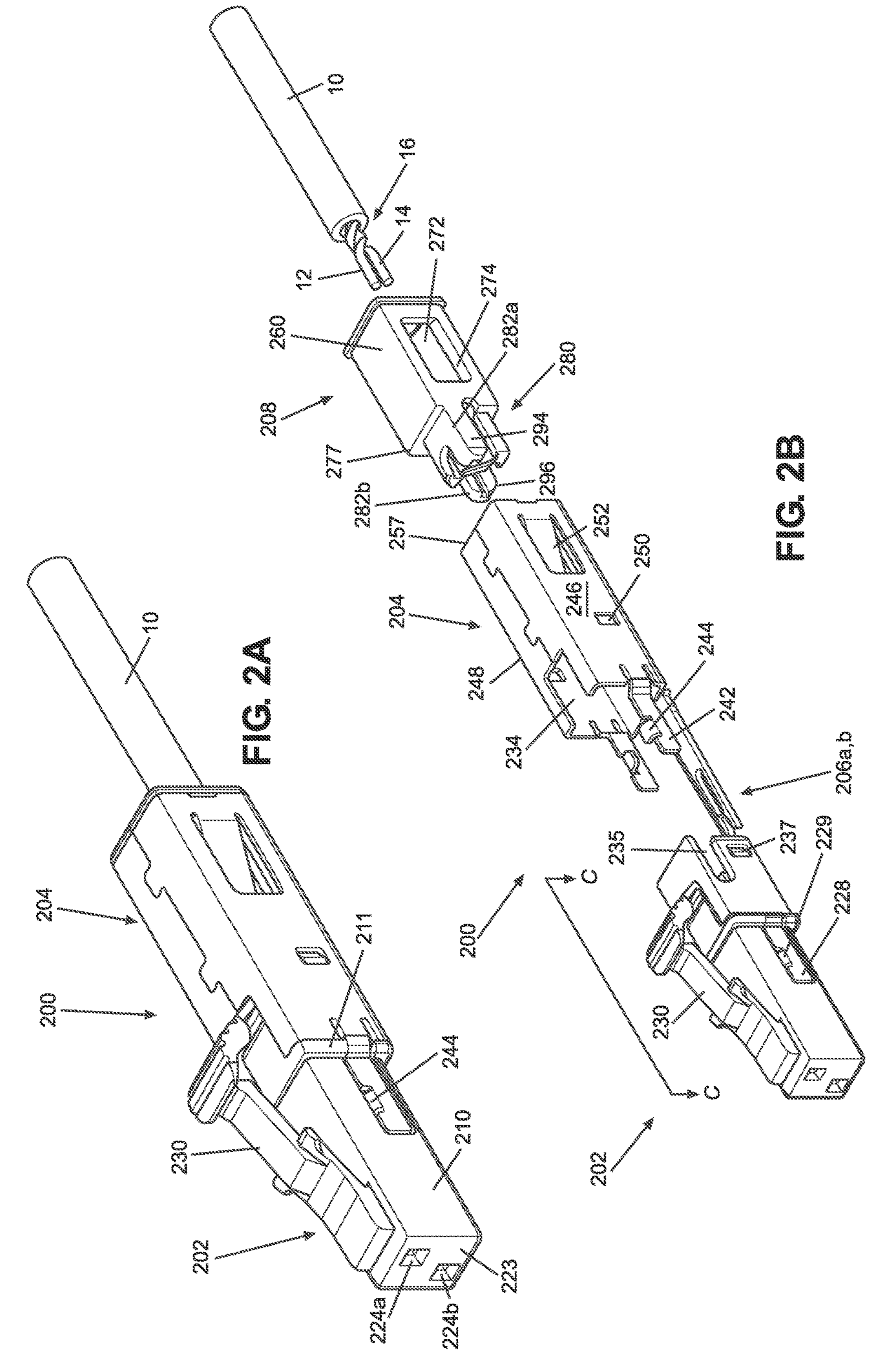
FIGS. 2A-2D illustrate an example embodiment of a free connector for a single pair of electrical conductors including an assembled view, an exploded assembly view, a cross section of a forward connector body of the connector and a pair of electrical contacts of the connector, respectively.
Figure 2C:
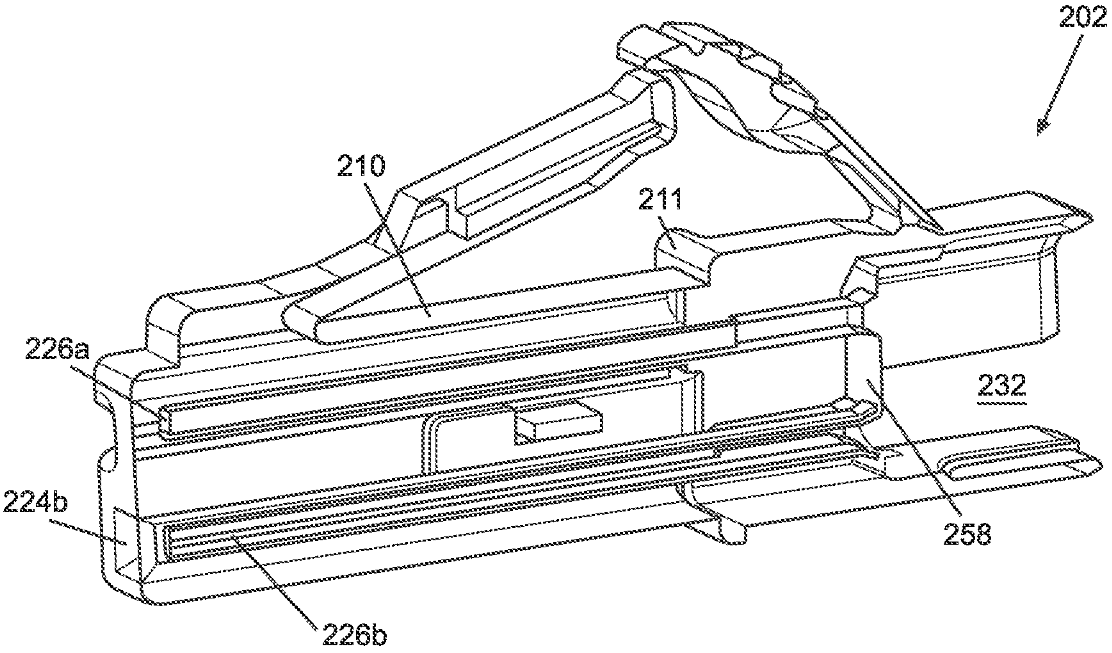
Figure 2D:
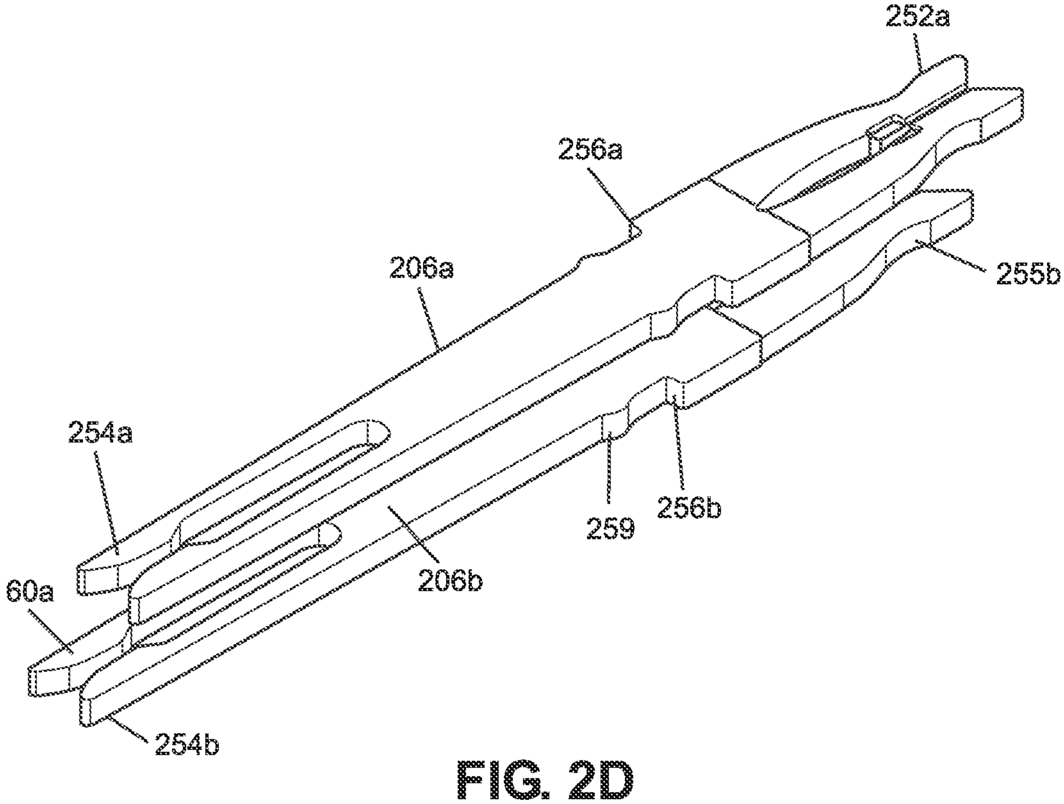

FIG. 1A illustrates two example embodiments of cables containing one or more single twisted pairs of conductors. The first cable 10 includes first and second conductors 12, 14 that are twisted together to form a single twisted pair 16. The conductors 12, 14 are enclosed by a protective jacket 18. The second cable 20 includes first through fourth conductors 22, 24, 26, 28. Conductors 22 and 24 are twisted together to form a first single twisted pair 30, and conductors 26 and 28 are twisted together to form a second single twisted pair 32. The twisted pairs 30 and 32 are separated by a separator 34, and are encased in a protective jacket 36. In certain example embodiments, the cables 10, 20 include a number of twisted pairs greater than two. In certain example embodiments, each single twisted pair of conductors, e.g., 16, 30, 32, is configured for data transmission up to 600 MHz (ffs) and has a current carrying capacity up to 1 A. Each single twisted pair of conductors, e.g., 16, 30, 32, can be connectorized with the various embodiments or combination of embodiments of free connectors and fixed connectors as described herein. FIG. 1B is an example of a shielded cable 40. The shielded cable 40 includes an outer jacket 42, a foil shield 44, a drain wire 46, and a single twisted pair 48 of conductors 50 and 52; each of the conductors 50 and 52 is provided with insulation 54.

Referring to FIGS. 2A-2D an example embodiment of a free connector 200 for a single twisted pair of electrical conductors is illustrated. Free connector 200 includes a forward connector body 202, a metal frame 204, a pair of electrical contacts 206*a*, 206*b* and a rear connector body 208. Free connector 200 can be coupled to a single twisted pair of conductors, e.g., conductors 12 and 14 of the single twisted pair 16 of cable 10.

The forward connector body 202 includes an elongate forward portion 210 and a rear receiving portion 212 that is separated by a shoulder 211.

The elongate forward portion 210 of the forward connector body 202 includes a forward face 223 having a pair of offset openings, 224*b* corresponding to contact receiving channels 226*a*, 226*b*; the openings 224*a*, 224*b* receive pin contacts that electrically interface with the tuning fork contacts 206*a*, 206*b*. In certain embodiments, a recess 228 is provided on each side face of the elongate forward portion 210 to interface with and retain the metal frame 204. Each recess 228 includes a recessed notch 229 to receive an interfacing tab 244 of the metal frame 204 to further ensure that the metal frame 204 remains secured to the forward connector body 202. The forward connector body 202 also includes a cantilevered latch 230.

The rear receiving portion 212 of the forward connector body 202 is unitary (e.g. molded as a single unit) with the elongate forward portion 210 of the forward connector body 202. The rear receiving portion 212 defines a central cavity 232 that provides rear access to the contact receiving channels 226*a*, 226*b* of the elongate forward portion 210. Each side face 231, 233 of the rear receiving portion 212 includes a slot 235 to interface with the rear connector body 208 and an outward extending tab 237 to interface with the metal frame 204.

The metal frame 204 of the free connector 200 comprises a metal shell body 240 having a central cavity 234 that is slidable over the rear receiving portion 212 of the forward connector body 202. The metal frame 204 is held in place about the rear receiving portion 212 through use of a pair of flex tabs 242 that interface with corresponding recesses 228 of the forward connector body 202. Each of the flex tabs 242 includes in inward facing tab 244 to interface with recessed notch 229 of the forward connector body 202. Each side face 246, 248 of the metal frame 204 includes an opening 250 to interface with outward extending tab 237 of the forward connector body 202. Each point of interface between the metal frame 204 and the forward connector body 202 assists in securing the metal frame 204 to the forward connector body 202. Each side face 246, 248 of the metal frame 204 is additionally equipped with an inward directed beam 252 (e.g. shield beam) to establish an electrical interface with a cable shield (foil or drain wire) of the cable carrying the single pair of conductors (e.g., see FIG. 1B). Note that, while the metal frame 204 includes a shield beam for interfacing with a shield of a shielded cable, the metal frame 204 can also be utilized in conjunction with a non-shielded cable. In the instance of a non-shielded cable, the metal frame provides additional structural support to the connector 200. In certain non-shielded uses, the frame 204 is alternatively made of a non-metal material, e.g., plastic.

Electrical contacts 206*a*, 206*b* each include a forward portion having a tuning fork receptacle contact 254*a*, 254*b* while a rear portion of each of the electrical contacts 206*a*, 206*b* includes an insulation displacement contact (IDC) 255*a*, 255*b*. Each tuning fork receptacle contact 254*a*, 254*b* includes a pair of opposing spring arms 60*a*, 60*b* presenting an angled opening to receive a pin contact. Each of the electrical contacts 206*a*, 206*b* includes a shoulder 256*a*, 256*b* that interfaces with a stop 258 (see FIG. 2C) within the elongate forward portion 210 of the forward connector body 202. The electrical contacts 206*a*, 206*b* include one or more tangs 259 to help retain each of the tuning fork receptacle contacts 254*a*, 254*b* within their respective contact receiving channels 226*a*, 226*b* of the forward connector body 202.

The rear connector body 208 of the free connector 200 includes a rear body portion 260 that defines a central cavity 272 into which is inserted a pair of conductors (e.g., conductors 12, 14). Each side face is provided with an elongate opening 274 into which the inward directed beams 252 of the metal frame 204 extend wherein an electrical interface with the foil (or drain wire) of a conductor within the cavity 272 is established. A latch (now shown) on a lower face of the rear body portion 260 interfaces with a cut-out (not shown) of the metal frame 204 to secure the rear connector body 208 to the metal frame 204. A lip edge 277 of the rear body portion 260 seats against a rear face 257 of the metal frame 204.

The rear connector body 208 of the free connector 200 includes a contact receiving portion 280 that extends forward from the rear body portion 260. The contact receiving portion 280 is essentially divided into a first half 282*a* to accommodate the upper positioned electrical contact 206*a* and a second half 282*b* to accommodate the lower positioned electrical contact 206*b*. The first half 282*a* of the contact receiving portion 280 includes an upward channel that is contoured to direct the end of a conductor upward (e.g., a 90 deg. bend) to extend through a contact receiving slot. The second half 282*b* of the contact receiving portion 280 includes a downward channel that is contoured to direct the end of a conductor downward (e.g., a 90 deg. bend) to extend through a contact receiving slot.

The IDC contacts 255*a*, 255*a* of the electrical contact 206*a*, 206*b* are inserted into their respective contact receiving slots to establish an electrical interface with the conductor extending there through. The IDC contacts 255*a*, 255*b* applies a normal force to the respective conductor and cuts through both the insulation of the conductor and a portion of the conductor itself to create the electrical interface. Note that the electrical interface is established without requiring crimping of the conductor to the electrical contact, i.e. the electrical interface is crimp-less. The upward channel is, in part, defined by an upper outward extending arm 294 while the downward channel is, in part, defined by a lower outward extending arm 296. Each of upper outward extending arm 294 and lower outward extending arm 296 interface with respective corresponding slots 235 of the forward connector body 202 when the free connector 200 is assembled to assist in aligning and stabilizing the rear connector body 208 relative to the forward connector body 202.

Further details regarding the free connector 200 and/or a fixed connector 300 (described herein for reference) can be found in PCT Publication WO 2019/165466, entitled "Connectors and Contacts for a Single Twisted Pair of Conductors," and filed Feb. 26, 2019. The noted PCT Publication is hereby incorporated by reference in its entirety.

Figure 3A:
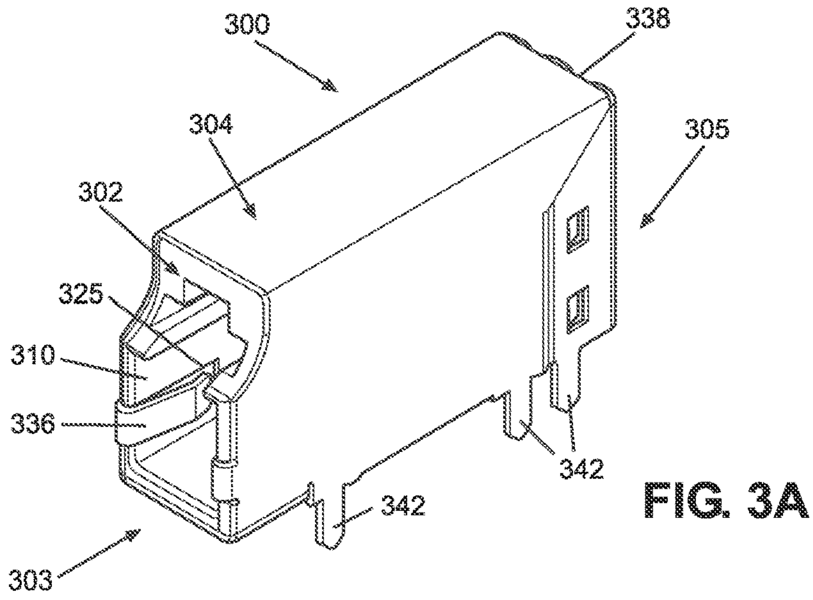
FIGS. 3A-3C illustrate an example embodiment of a fixed connector, which is configured to mate with the free connector of FIGS. 2A-2D, including an assembled perspective view, a front view and a pair of electrical contacts of the fixed connector, respectively.
Figure 3B:
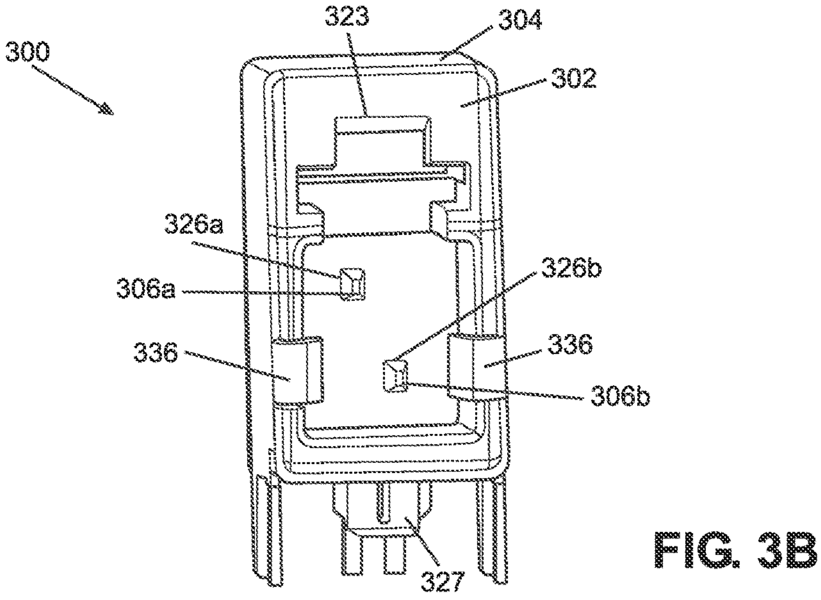
Figure 3C:
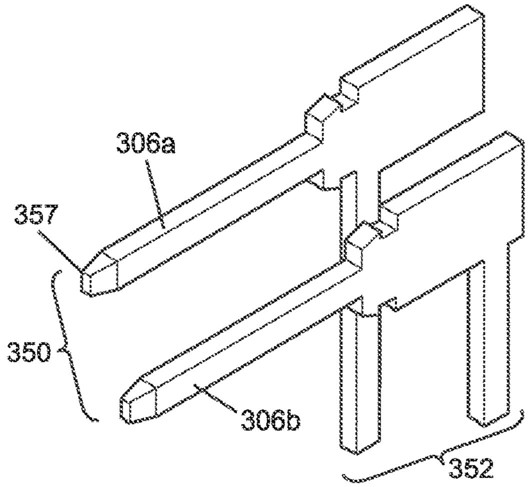

An example of a fixed connector 300, suitable to mate with free connector 200 is illustrated in FIGS. 3A-3C. The fixed connector 300 generally includes a housing body 302, a metal frame 304 and a pair of pin contacts 306*a*, 306*b* (straight or bent for board mounting). A forward end 303 and a rearward end 305 further define the fixed connector 300.

The housing body 302 of the fixed connector 300 includes a forward central channel 310 that receives the free connector 200. A notch 323 is provided within the housing body 302 to interface with the cantilevered latch 230 of the free connector 200. Further, side recesses 325 in each side face serve as an interface element for the metal frame 304. A mounting pin 327 extends from the housing body 302 and through the metal frame 2602 for circuit board mounting of the connector 300. The housing body further includes openings 326*a*, 326*b* to channels (not shown) into which the pin contacts 306*a*, 306*b* are inserted; when fully inserted, the pin contacts 306*a*, 306*b* extend into the forward central channel 310.

The metal frame 304 of the fixed connector 300 is a metal shell defining a central cavity that is slidable over the housing body 302. The metal frame 304 is held in place about the housing body 302 through use of a pair of clips 336 that interface with the side recesses 325. In certain embodiments, a back face 338 of the metal frame is enclosed with a back panel 340 while in other embodiments t back face 338 is left open. Further, in certain embodiments, the metal frame 304 is provide with one or more shield pins 342 that are insertable into vias in an application where the fixed connector 300 is board mounted.

Each of the pin contacts 306*a*, 306*b* of the fixed connector 300 include a forward portion 350 and a rear portion 352 that can be electrically coupled to a conductor, e.g. conductor 10, in any suitable manner. The forward portion 350 includes tapered faces that form a four-sided pyramid shape with a flattened apex 357; the flattened apex 357 having a rectangular or square cross-section.

Figure 4A:
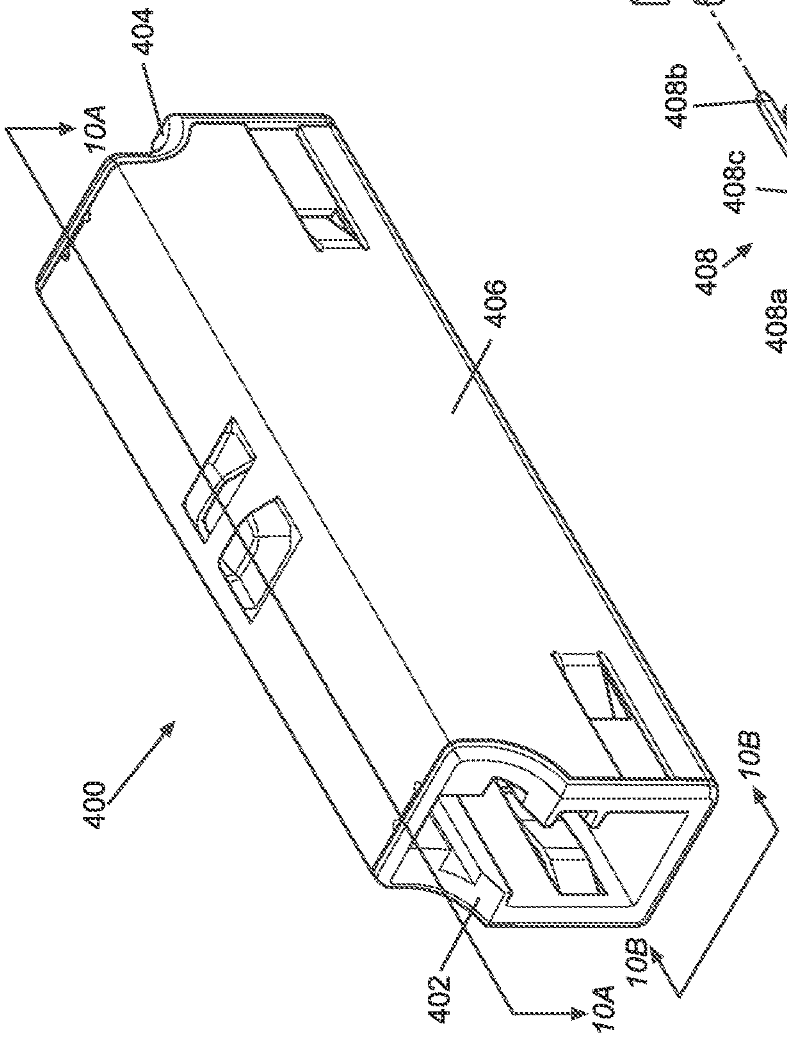
FIGS. 4A-4B illustrate an example embodiment of a shielded coupler according to the present disclosure including an assembled perspective view and an exploded assembly perspective view of the coupler, respectively.
Figure 4B:
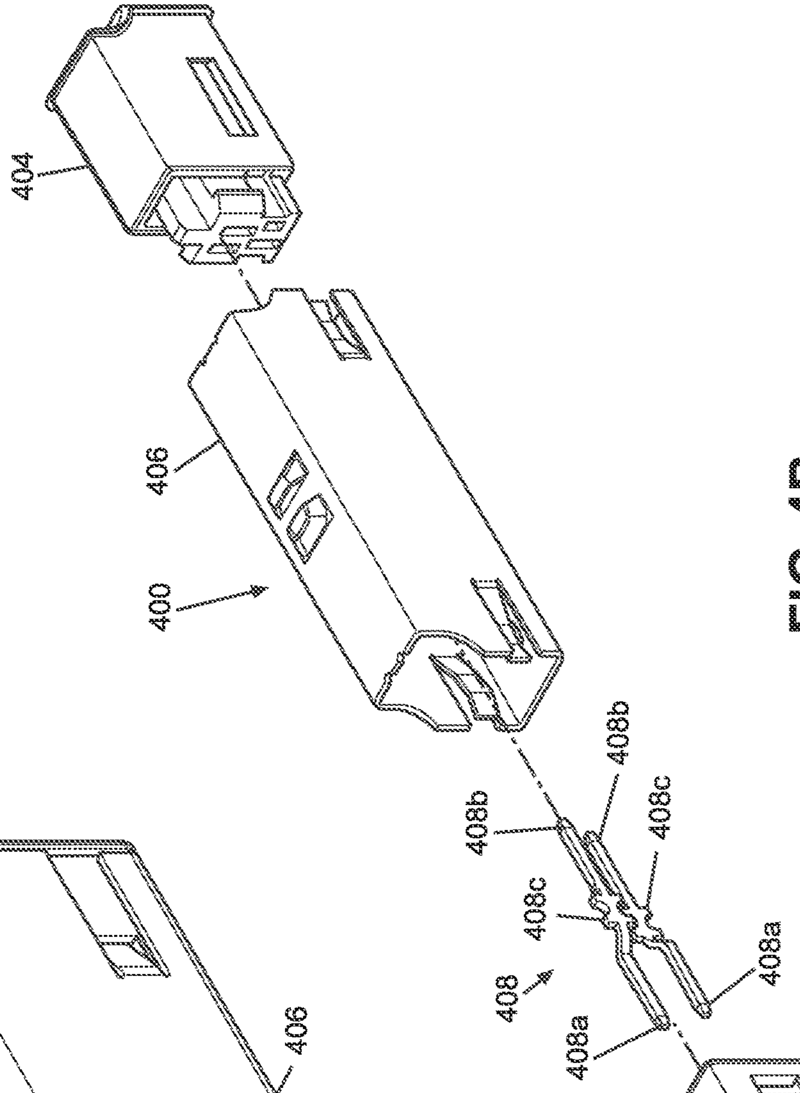
Figure 4B:
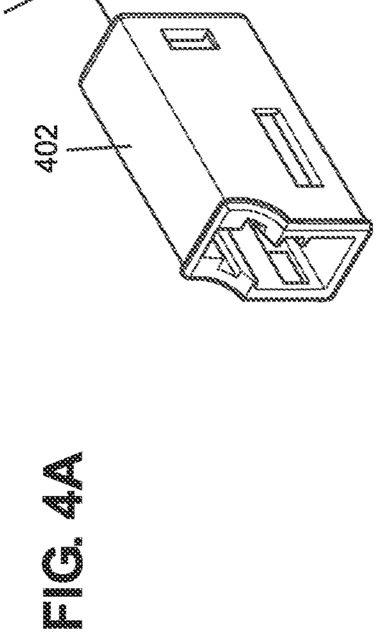

Referring to FIGS. 4A-4B an example embodiment of a coupler 400 according to the present disclosure is illustrated. As shown, the coupler 400 includes a first housing 402, a second housing 404, a metal shield 406 and a pair of contacts 408, each having a forward contact 408*a* and a rearward contact 408*b* separated by a central portion 408*c*.

Figure 5A:
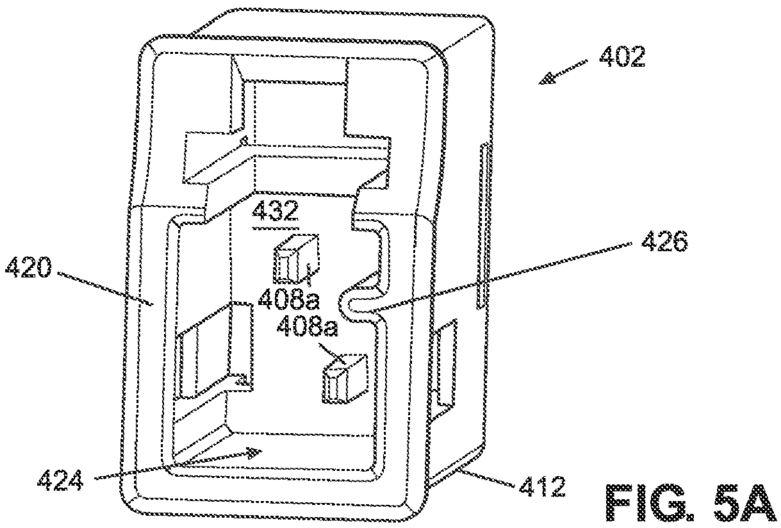
FIGS. 5A-5C provide a front perspective, side perspective and rear perspective view, respectively, of a first housing of the coupler of FIGS. 4A-4B.
Figure 5B:
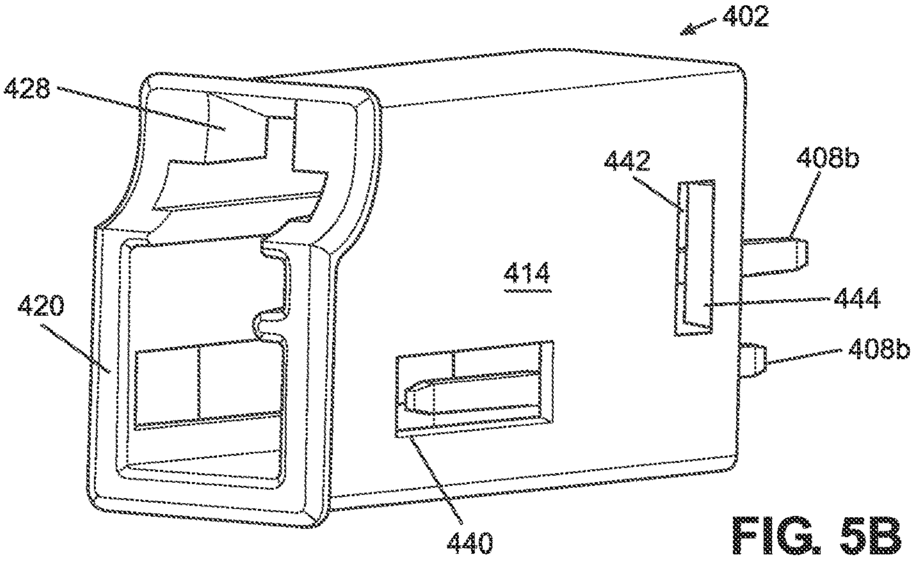
Figure 5C:
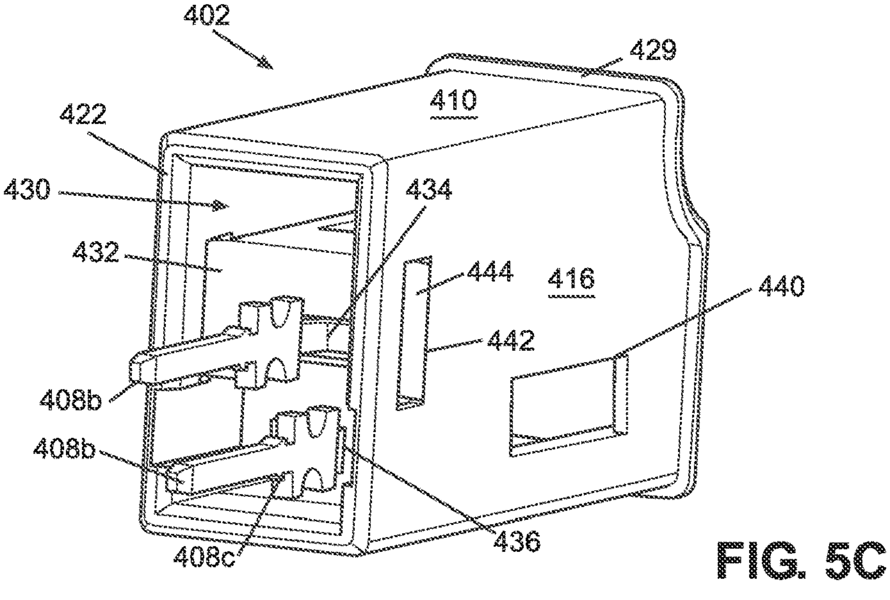
Figure 6A:
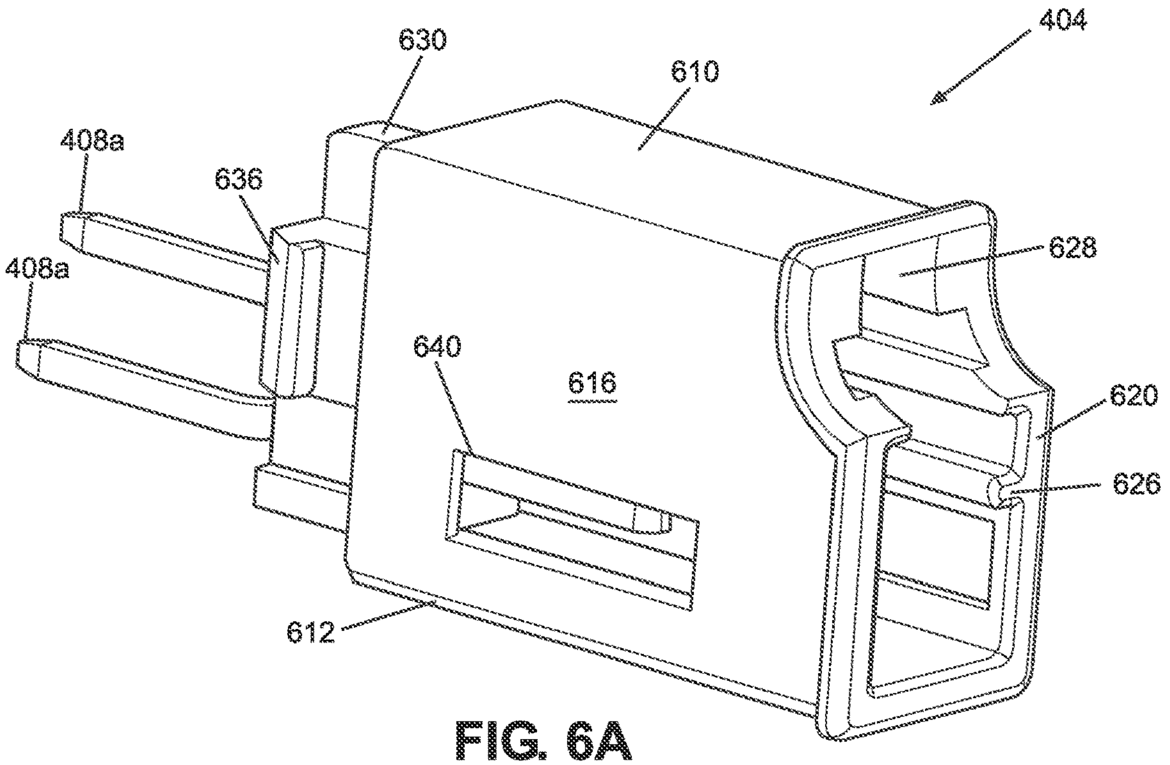
FIGS. 6A-6D provide a side perspective, front perspective, rear perspective and cross-sectional view, respectively, of a second housing of the coupler of FIGS. 4A-4B.
Figure 6B:
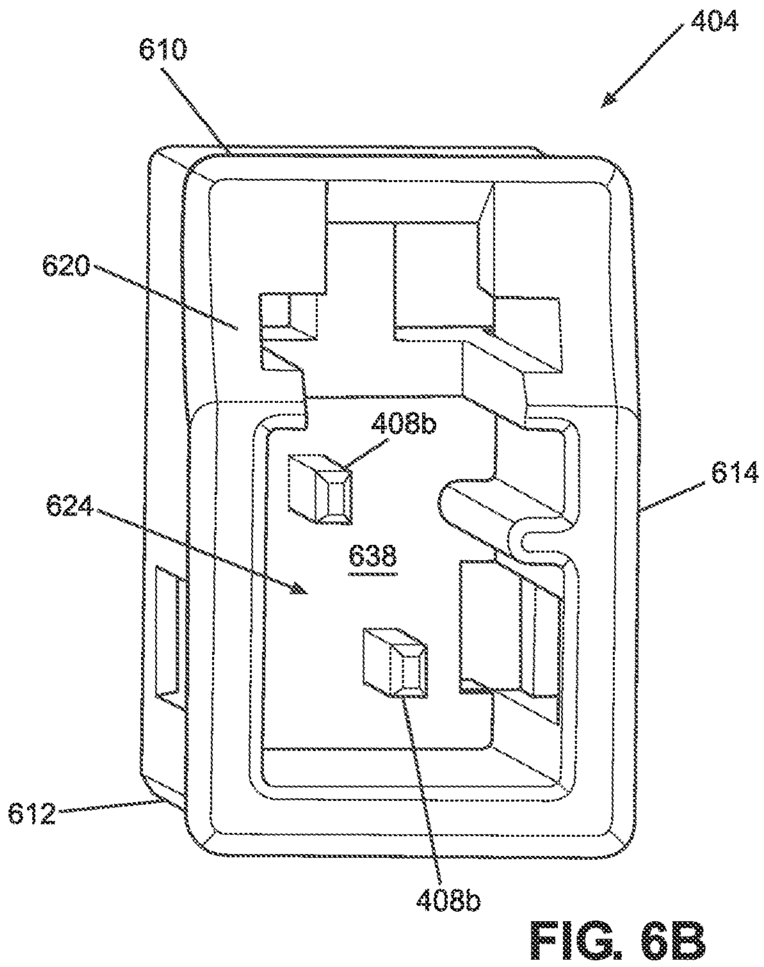
Figure 6C:
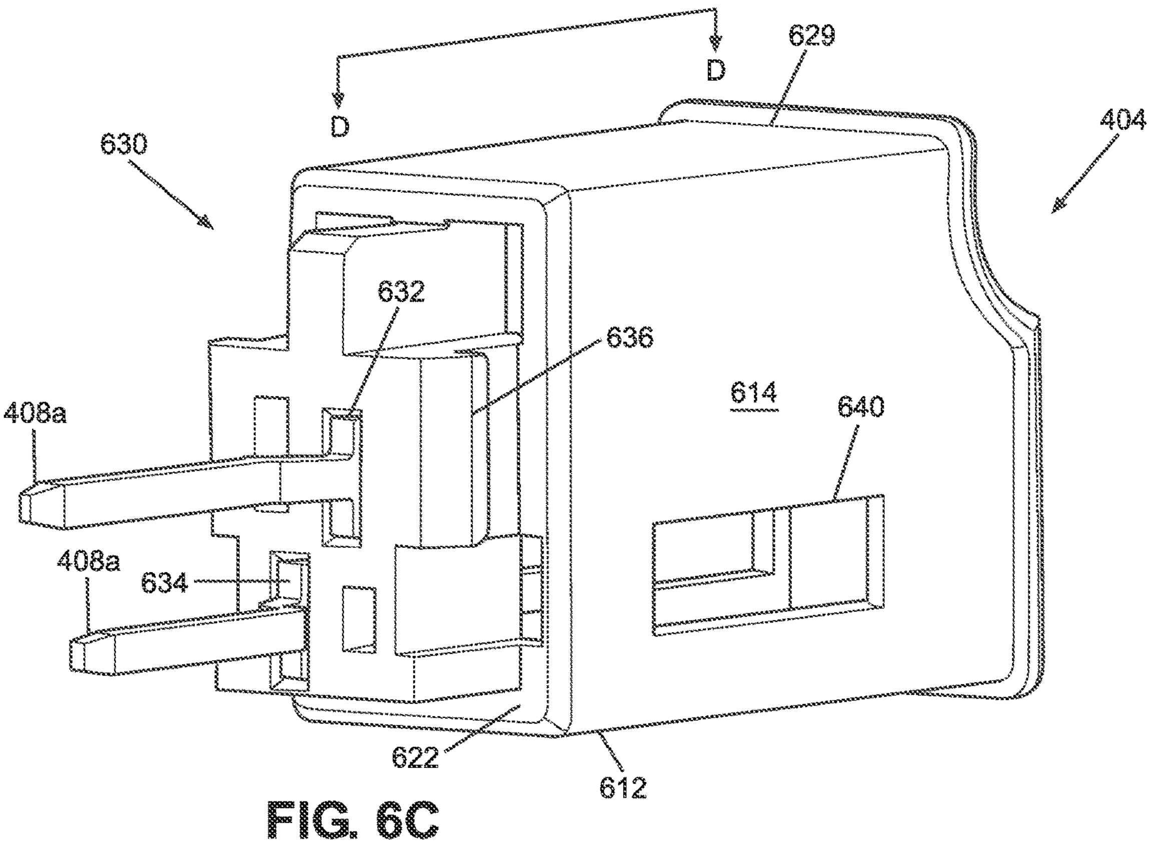
Figure 6D:
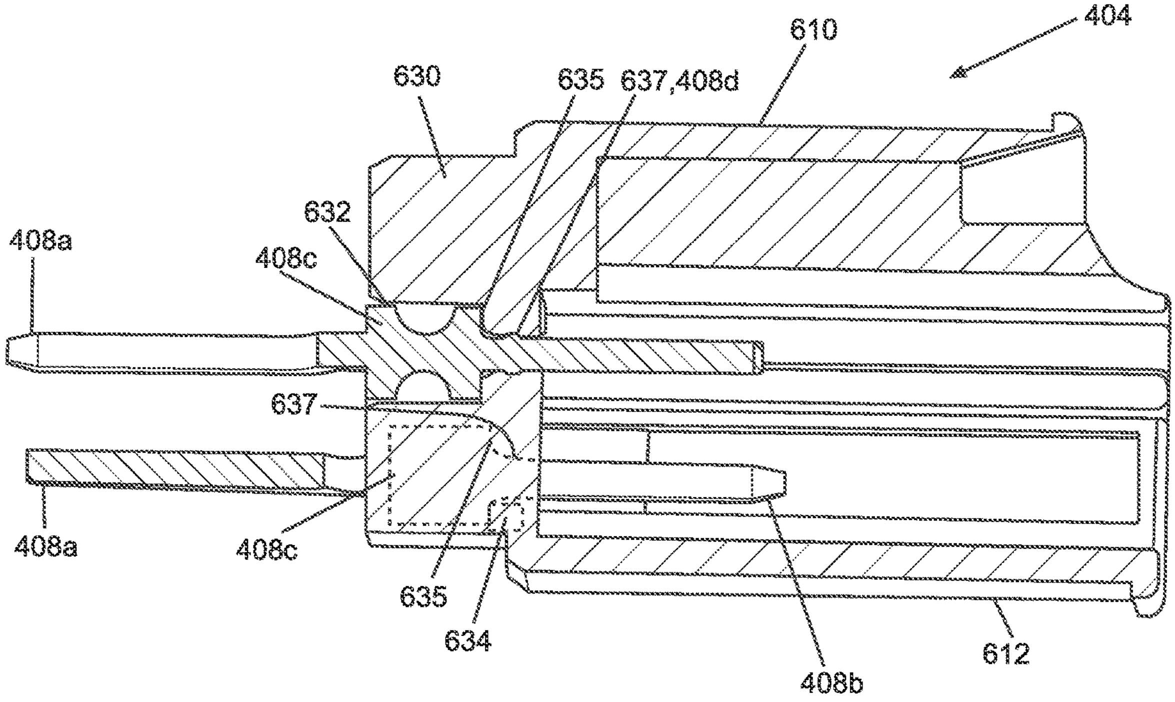

FIGS. 5A-5C further illustrate the details of the first housing 402 with the contacts 408 inserted therein. As shown, the first housing 402 includes an upper face 410 and a lower face 412 connected by a first side face 414 and a second side face 416 that, together, define a forward face 420 and a rearward face 422. The forward face 420 surrounds a forward cavity 424 into which extends the forward contact 408*a* of each of the pair of contacts 408. In certain embodiments, a projection 426 projects from one, or more, of the faces 414, 416, 420, 422 into the forward cavity 424 to align a connector 200 for insertion and/or prevent a non-compatible connector from being inserted therein. The forward face 420 further defines a recessed notched 428 that is configured to interface with and retain the cantilevered latch 230 of the connector 200. A lip edge 429 extends around the forward face 420 and serves to abut a first end 722 of the metal shield 406 when the first housing 402 is received within the first end 722.

The rearward face 422 of the first housing 402 defines a rearward cavity 430 that is separated from the forward cavity 422 by a wall 432. The wall 432 is provided with first and second channels 434, 436 that receive the forward contacts 408*a* of each of the pair of contacts 408 allowing them to pass through to the forward cavity 422. The wall 432 further acts as a stop for the central portion 408*c* of each of the contacts 408 to prevent over-insertion of the forward contacts 408*a*.

Each of the side faces 414, 416 includes a first elongate opening 440 that receives a flex tab 726 of the metal shield 406 that retains the first housing 402 within the metal shield 406; the flex tab 726 extends into the forward cavity 422 to make contact with the metal frame 204 of a connector 200 that is received therein. Each of the side faces 414, 416 includes a second elongate opening 442, which is generally oriented perpendicular to the first elongate opening 440, and includes a flanged edge 444 that extends into the rearward cavity 430. The flanged edge 444 of the first housing 402 interfaces with a hooked tab 636 of the second housing 404 to maintain a mechanically coupled position with the second housing 404.

FIGS. 6A-6D further illustrate the details of the second housing 404 with the contacts 408 inserted therein. As shown, the second housing 404 includes an upper face 610 and a lower face 612 connected by a first side face 614 and a second side face 616 that, together, define a forward face 620 and a rearward face 622. The forward face 620 surrounds a forward cavity 624 into which extends the rearward contact 408*b* of each of the pair of contacts 408. In certain embodiments, a projection 626 projects from one, or more, of the faces 614, 616, 620, 622 into the forward cavity 624 to align a connector 200 for insertion and/or prevent a non-compatible connector from being inserted therein. The forward face 620 further defines a recessed notched 628 that is configured to interface with and retain the cantilevered latch 230 of the connector 200. A lip edge 629 surround the forward face 620 and serves to abut a second end 724 of the metal housing 406 when inserted within the metal shield 406.

The rearward face 622 of the second housing 404 frames a rear projection 630 that is sized to be received within the rear cavity 430 of the first housing 402. The rear projection 630 includes first and second channels 632, 634 that receives the rearward contacts 408*b* of the pair of contacts 408 to allowing them to pass through to the forward cavity 624. The channels 632, 634 on the rear projection 630 include openings that are sized to receive the central portion 408*c* of each of the pair of contacts 408. A stop 635 is formed within each of the channels 632, 634 to prevent over-insertion of the rearward contact 408*b* of the pair of contact 408.

Further, each of channels 632, 634 is formed to include a retention notch 637 that interfaces with a tang 408*d* on each of the pair of contacts 408. The interface of the retention notch 637 and tang 408*d* ensures a correctly-oriented and fixed position for each of the contacts 408. Each side of the rear projection 630 includes a hooked tab 636 that interfaces with the flanged edge 444 of the first housing to mechanically couple the first housing 402 to the second housing. A rear wall 638 separate the forward cavity 624 from the rear projection 630.

Each of the side walls 614, 616 of the second housing includes an elongate opening 640 that receives a flex tab 728 of the metal shield 406 that retains the second housing 404 within the metal shield 406; the flex tab 728 extends into the forward cavity 624 to make contact with the metal frame 204 of a connector 200 that is received therein.

Figure 7A:
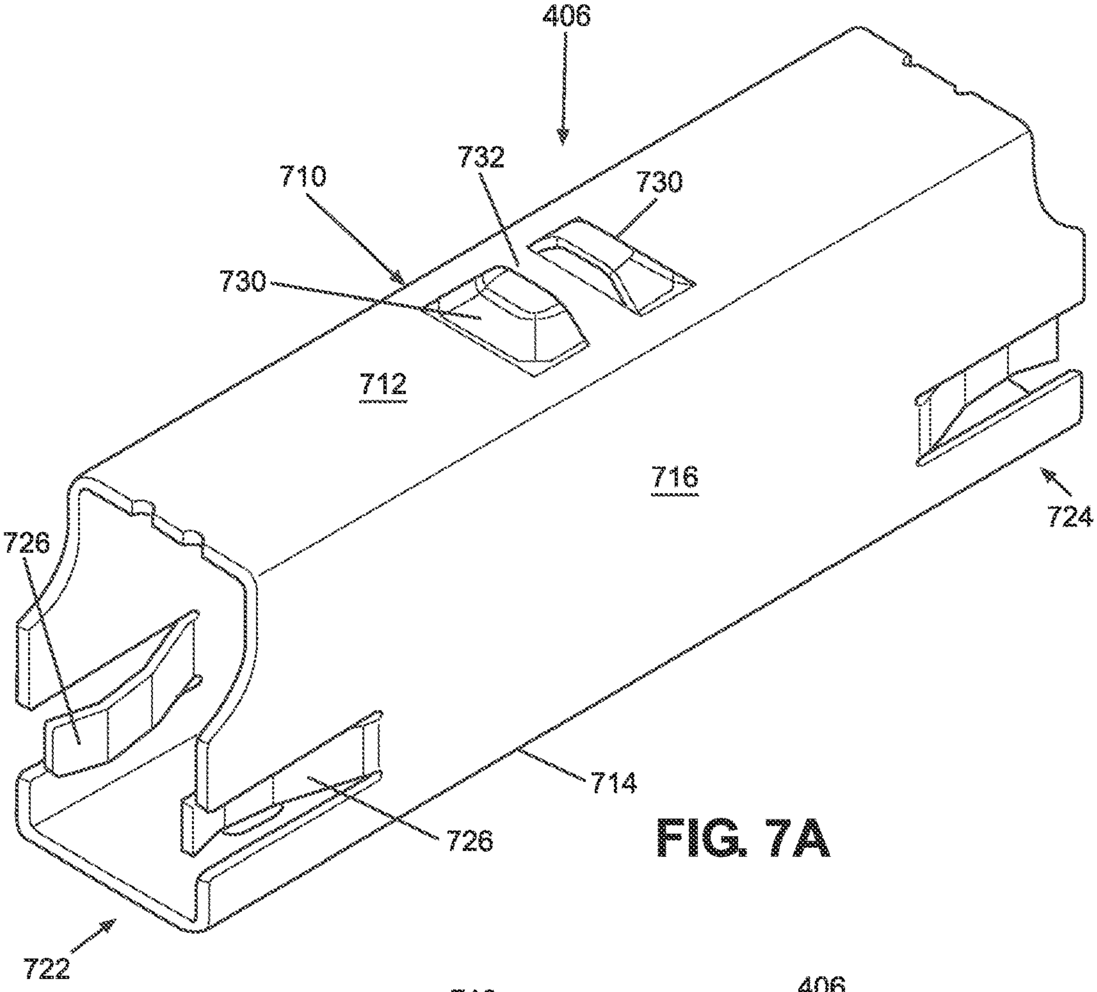
FIGS. 7A-7B provide a side perspective and front perspective view of a metal shield of the coupler of FIGS. 4A-4B.
Figure 7B:
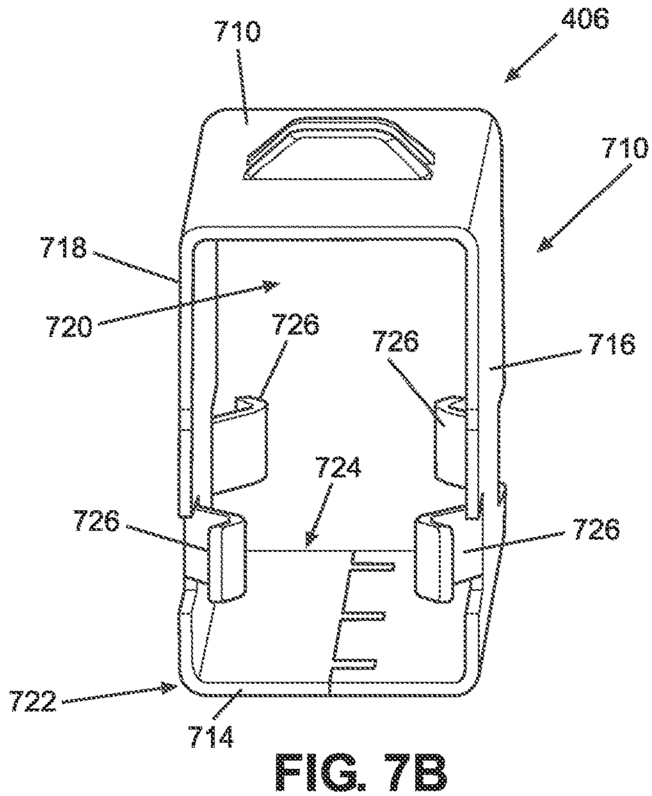

FIGS. 7A-7B further illustrate the details of the metal shield 406. As shown, the metal shield 406 generally comprises a singular housing 710 having an upper face 712 and a lower face 714 connected by side faces 716,718 that define a central channel 720 extending there through. The housing 710 includes a first end 722 that receives the first housing 402 and a second end 724 that receives the second housing 404. Each of the side walls 716, 718 at the first end 722 of the housing 710 includes a pair of opposed flex tabs 726 that are received within the first elongate opening 440 of each of the side faces 414, 416 of the first housing 402. Each of the side walls 716,718 at the second end 724 of the housing 710 includes another pair of opposed flex tabs 728 that are received within the elongate opening 640 of each of the side walls 614, 616 of the second housing 404. The pairs of flex tabs 726, 728 flex outward to receive the respective housing 402, 404 and flex inward to retain each of the housings 402, 404 therein. The inward flexing of the flex tabs 726, 728 additionally provides contact between the flex tabs 726, 728 and the metal tabs 242 of the metal frame 204 of the connector 200 that is received within each of the first housing 402 and the second housing 404.

Figure 8:
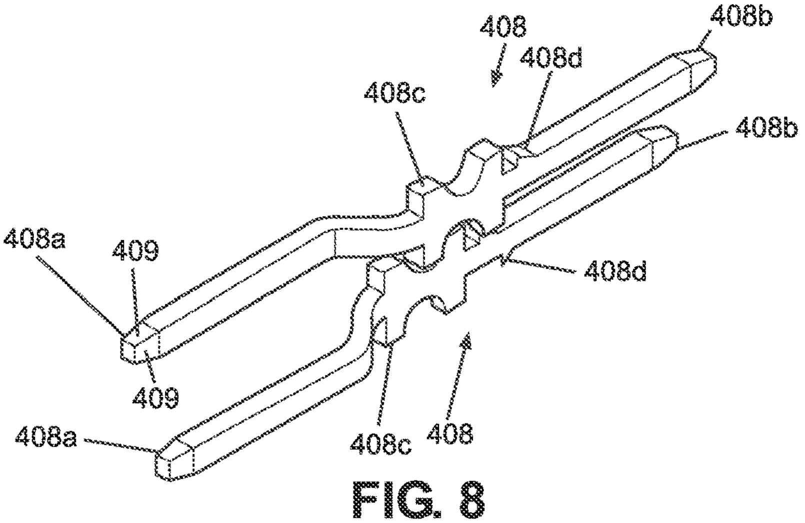
FIG. 8 is a perspective view of a pair of contacts of the coupler of FIGS. 4A-4B.

The top face 712 of the metal shield 406 presents a pair of opposing bosses 730 that extend away from the top face 712. The pair of opposing bosses 730 define a central open channel 732. The bosses 730 and the open channel 732 present an interface that is used to secure the position of the coupler 400 in a high density panel. In certain embodiments, the metal shield 406 is manufactured through use of a sheet metal stamping process wherein the resulting stamped component is subsequently formed into the illustrated metal shield 406. It should be noted that in certain non-shielding applications that metal shield 406 can, alternatively, be fabricated from non-metal materials FIG. 8 provides a closer perspective view of the pair of contacts 408. Each of the contacts 408 includes a forward contact 408*a* and rearward contact 408*b* separated by a central portion 408*c*. A tang 408*d* is provided on each of the contacts 408 to secure positioning of the contact 408 within the second housing 404. Each of the forward and rearward contacts 408*a*, 408*b* are pin contacts having a square or rectangular cross-section wherein the end of the pin includes four tapered faces 409 that form a four-sided pyramid shape with a flattened apex 411. In certain embodiments, the pins are of a rounded configuration. Notably the contacts 408 are offset from one another to help prevent alien crosstalk between couplers 400 and connectors 200 in high density application. Further, the forward contacts 408*a* are configured in a cross-over configuration to maintain polarity between the two connectors 200 when electrically coupled with the contacts 408.

Manufacturing the coupler 400 includes inserting the first housing 402 into the first end 722 of the metal shield 406. The rearward contacts 408*b* of the pair of contacts 408 are inserted into the first and second channels 632, 634 (see FIG. 6C) of the second housing 404 until secured in position by tangs 408*d*. The second housing 404, with forward contacts 408*a* extending there from, is inserted into the second end 724 of the metal shield 406 and further inserted into the rear cavity of the first housing 402. The forward contacts 408*a* are received within the first and second channels of 434, 436 (see FIG. 5C) of the first housing 402 until pushed there through and the hooked tabs 636 (see FIG. 6A) of the second housing 404 pass then engage the flanged edge 444 (see FIG. 5C) of the first housing 402 thereby mechanically coupling the first housing 402 to the second housing 404. Flex tabs 726 of the metal shield 406 receive and retain the first and second housings 402, 404 within the metal shield 406.

Figure 9A:
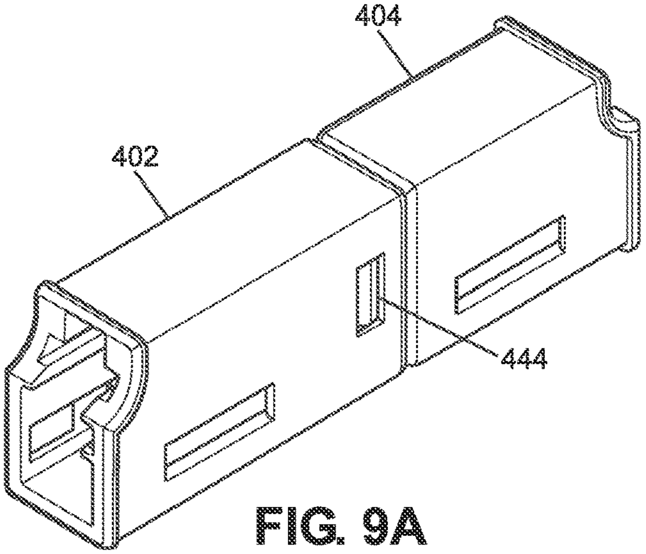
FIGS. 9A-9B provide perspective view of the first and second housings coupled.
Figure 9B:
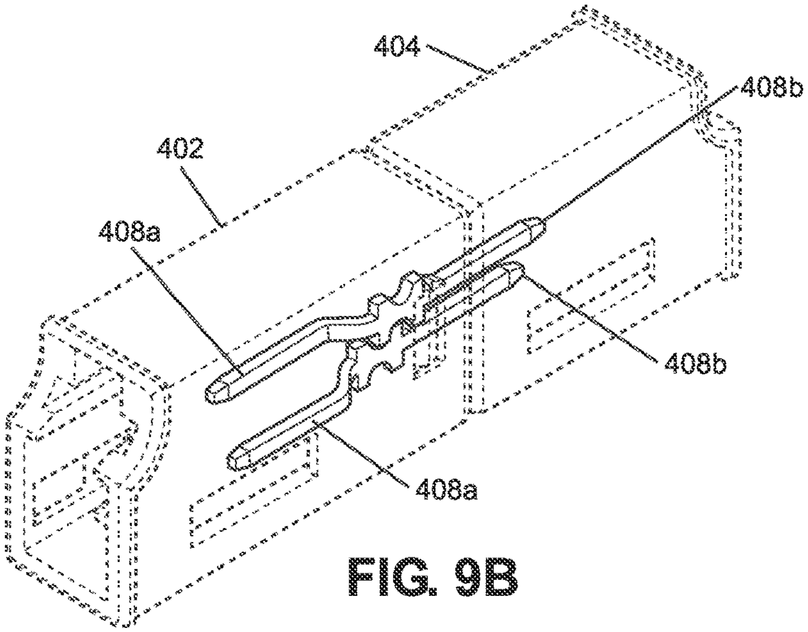
Figure 10A:
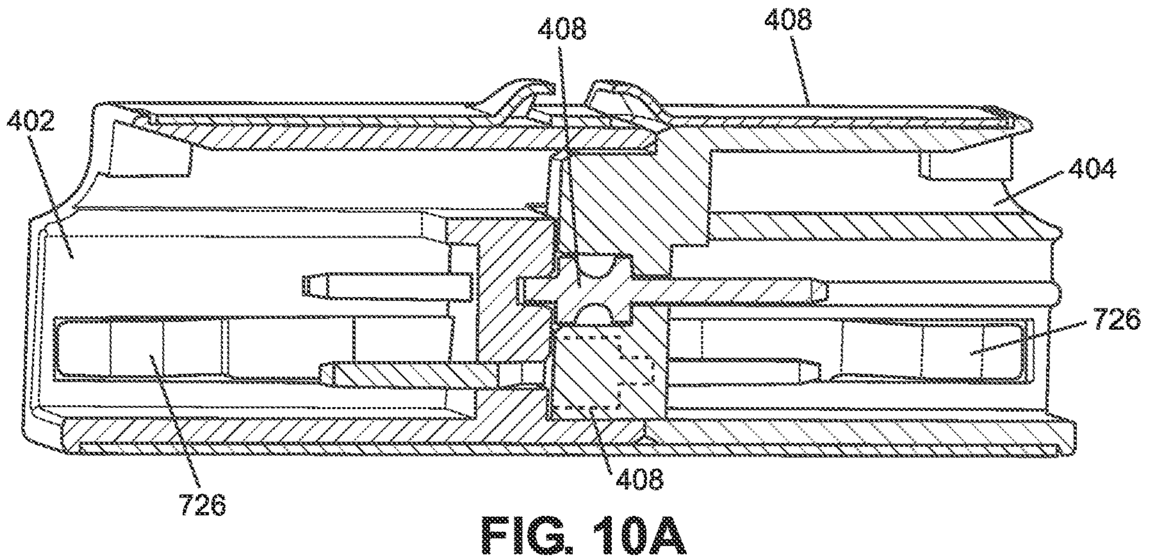
FIGS. 10A-10B provide cross-sectional views of the assembled coupler of FIG. 4A.
Figure 10B:
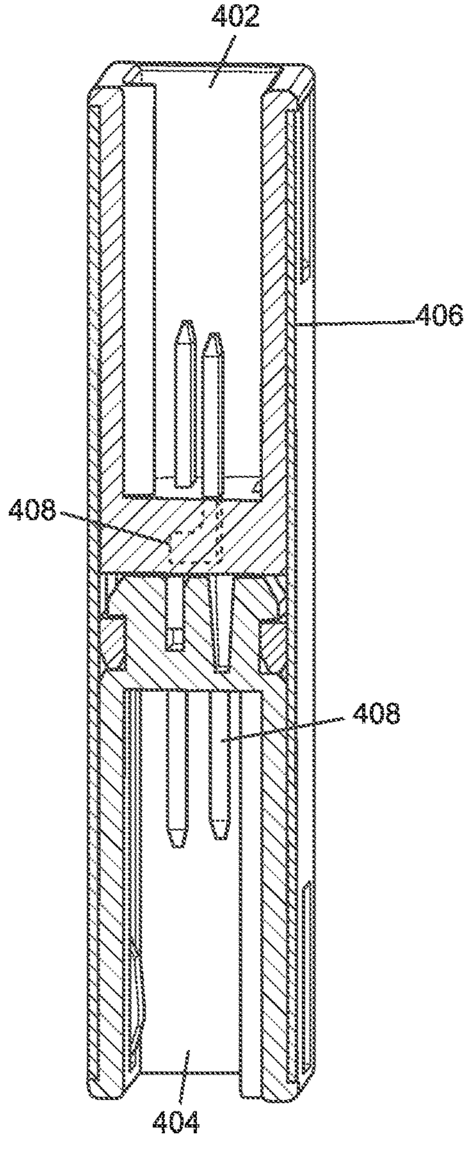
Figure 11A:
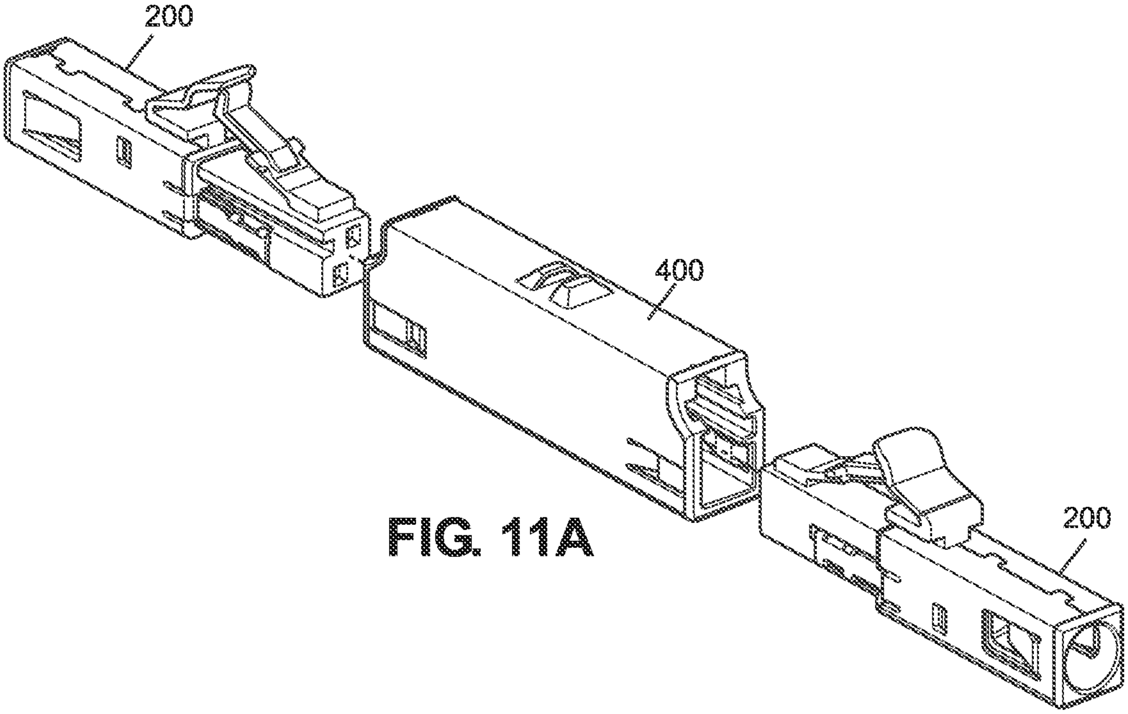
FIGS. 11A-11B provide perspective views of the coupler of FIGS. 4A-4B and two of the free connectors of FIGS. 2A-2D.
Figure 11B:
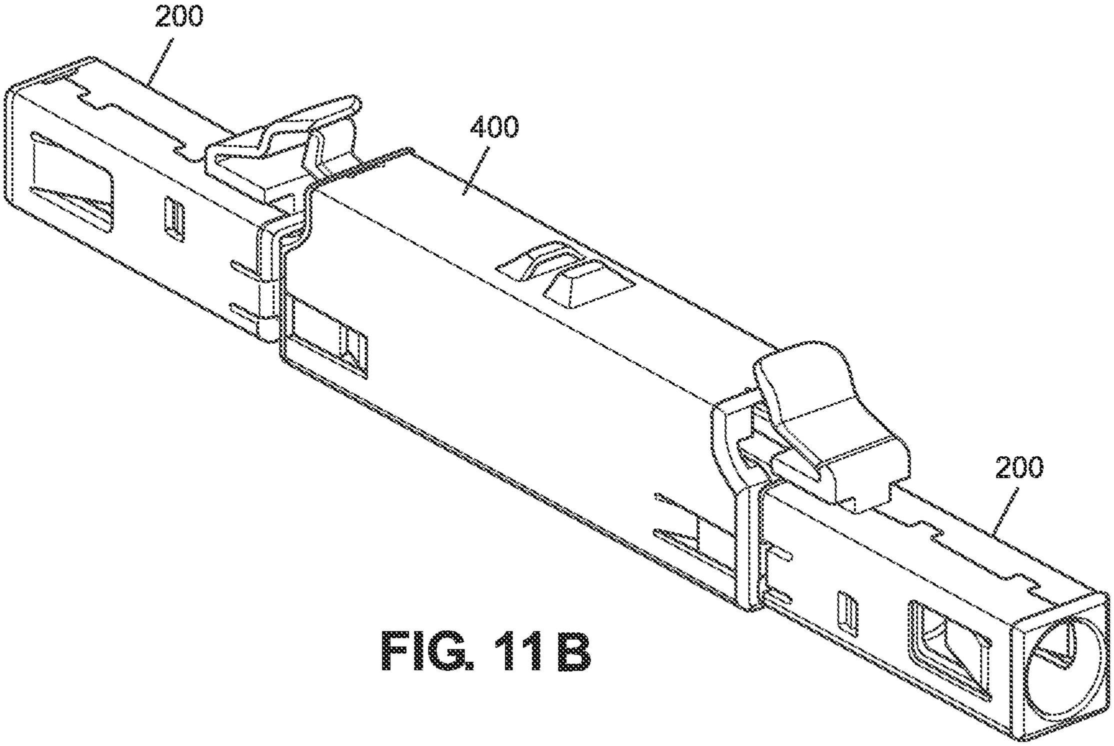

FIGS. 9A and 9B illustrate the first and second housings 402, 404 coupled to one another, absent the metal shield 406, with FIG. 9B illustrating the position of the pair of contacts 908 within the coupled first and second housings 402, 404. FIGS. 10A and 10B provide cross-sectional views of the assembled coupler, including the metal shield 406, taken along lines 10A-10A and 10B-10B, respectively, of FIG. 4A, with each illustrating the placement of the first housing 402, the second housing 404, the metal shield 406 and the pair of contacts 408. FIGS. 11A and 11B illustrate the assembled coupler 400 with two of the free connectors 200 ready to be received by the coupler 400 and with the two connectors 200 removably received within the coupler 400 and electrically coupled, respectively.

Figure 12A:
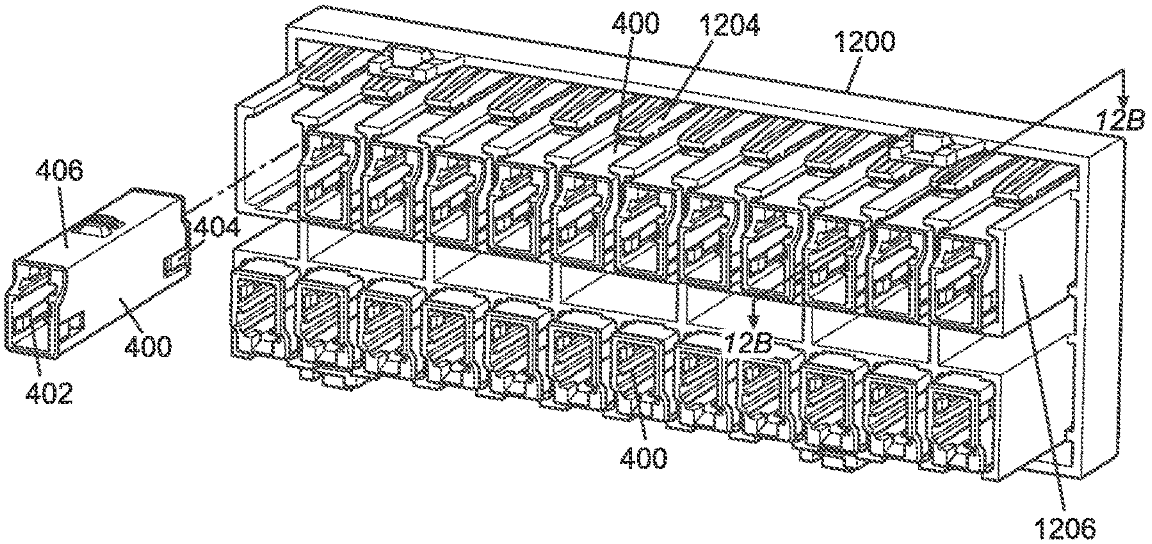
FIGS. 12A-12B illustrate an example configuration of a high density panel maintaining a plurality of couplers with each coupler capable of electrically coupling two free connectors.
Figure 12B:
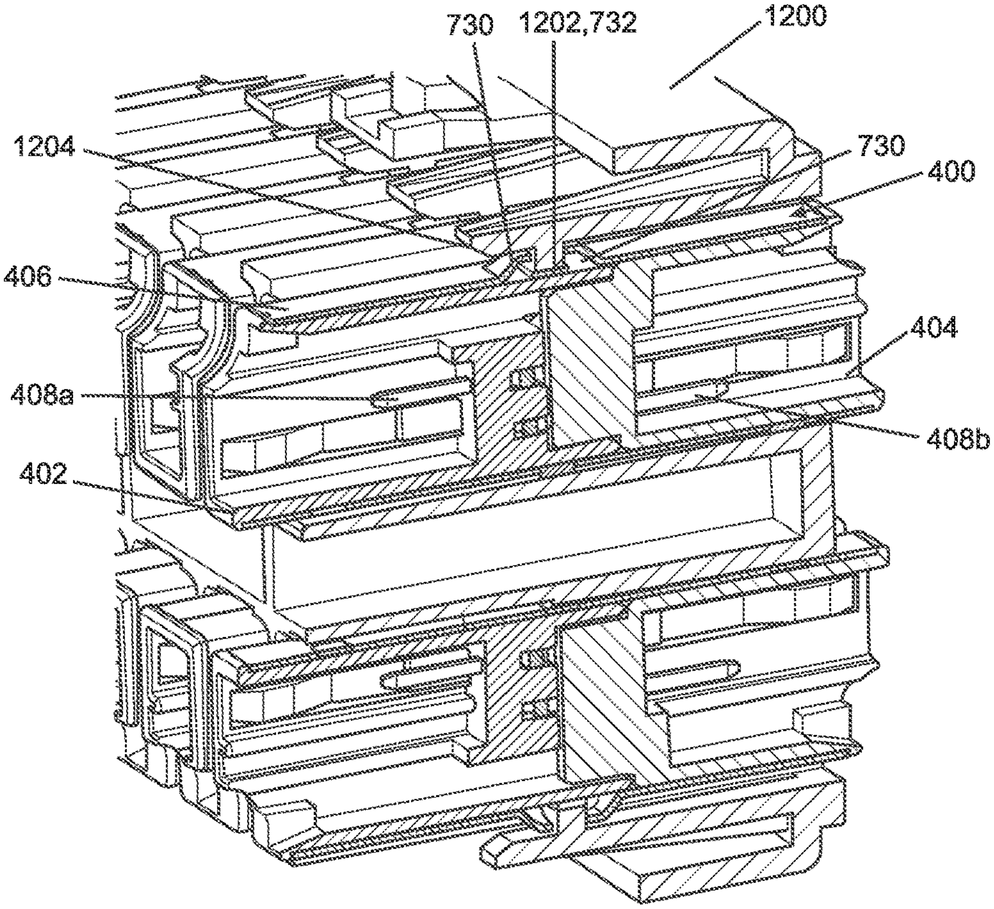
Figure 13A:
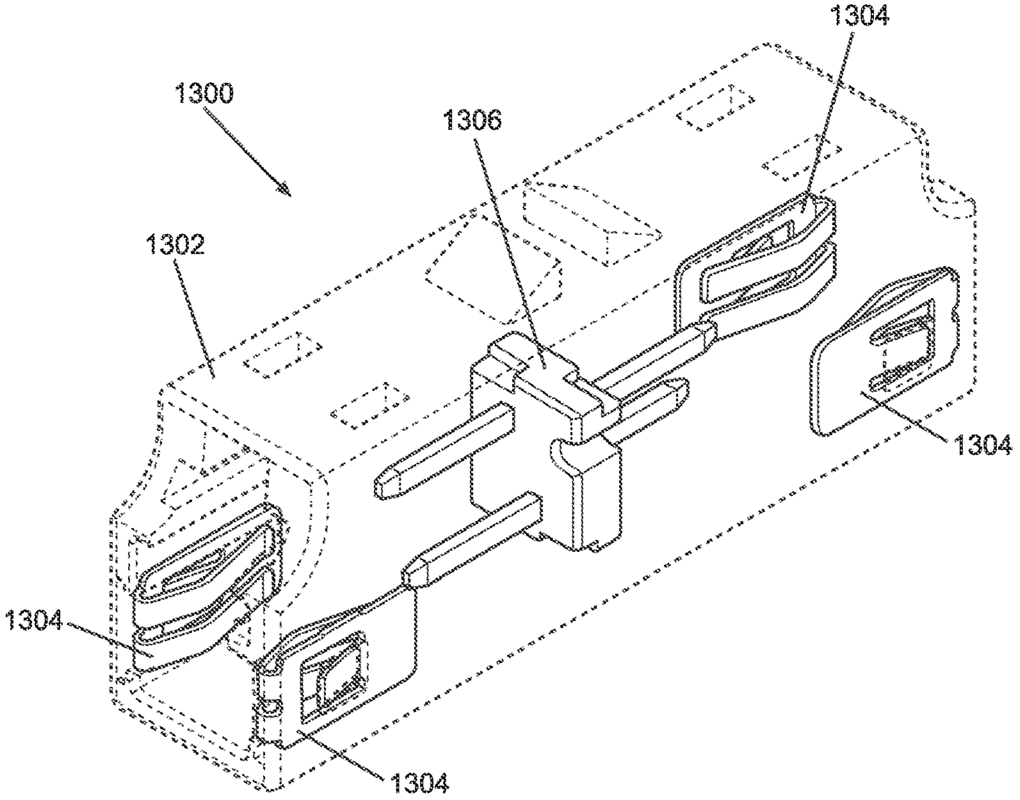
FIGS. 13A-13D illustrate an embodiment of a shielded coupler including a shadowed side perspective, a side perspective, a front/rear perspective (without contacts) and a front/rear perspective of the coupler (with contacts).
Figure 13B:
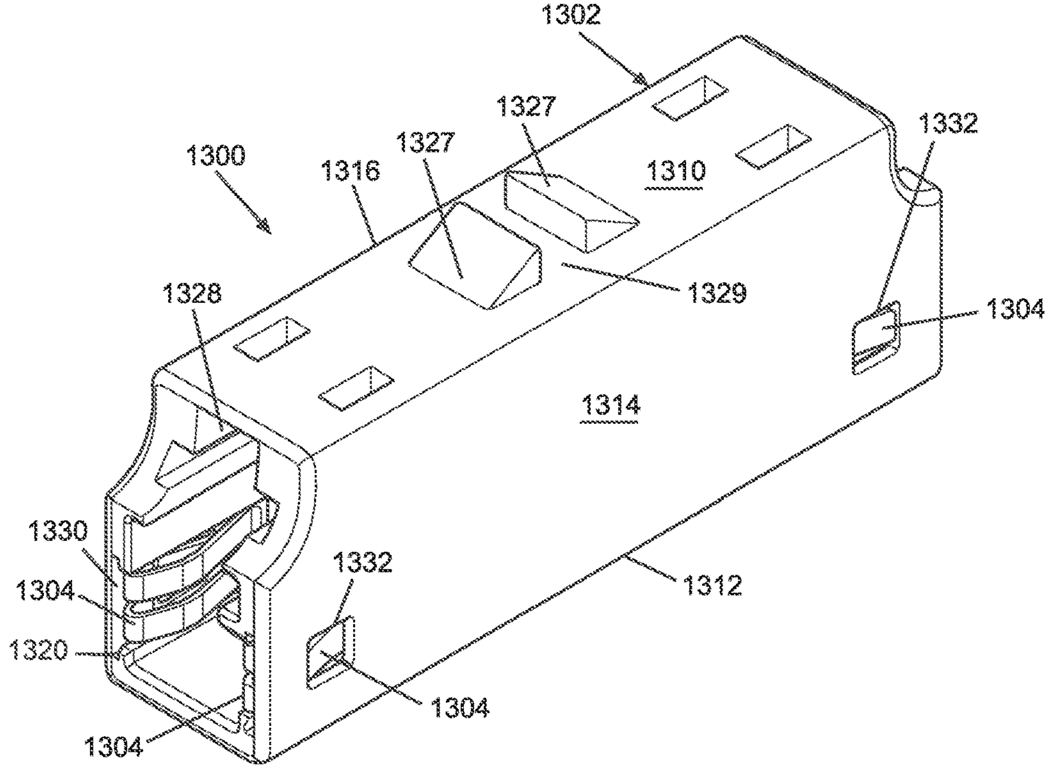
Figure 13D:
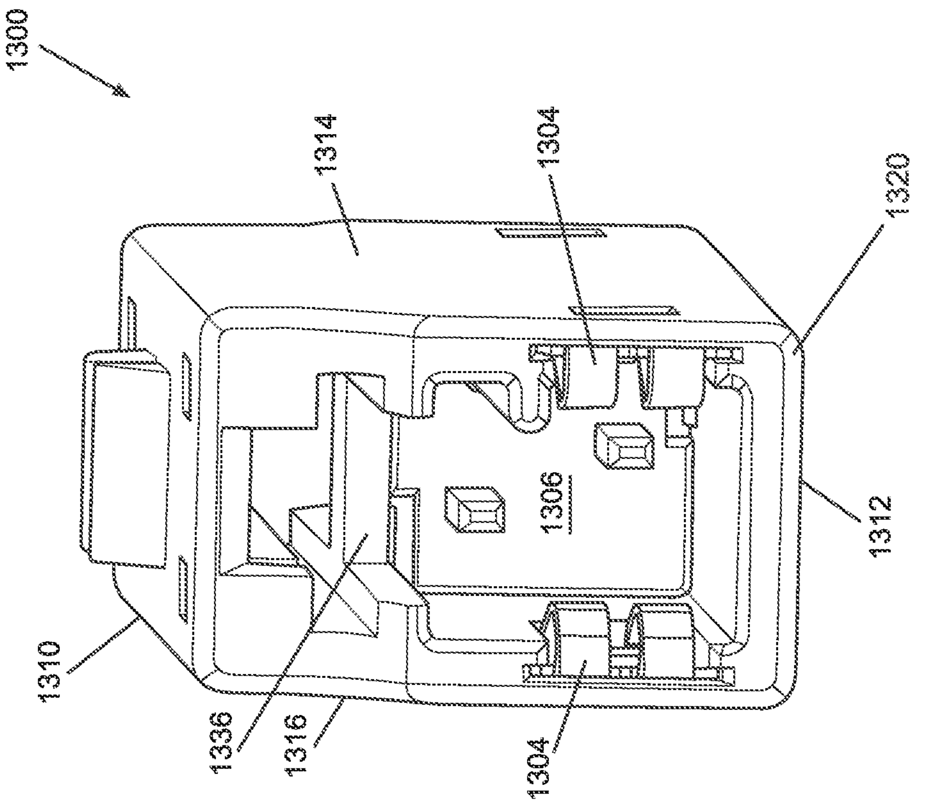
Figure 13C:
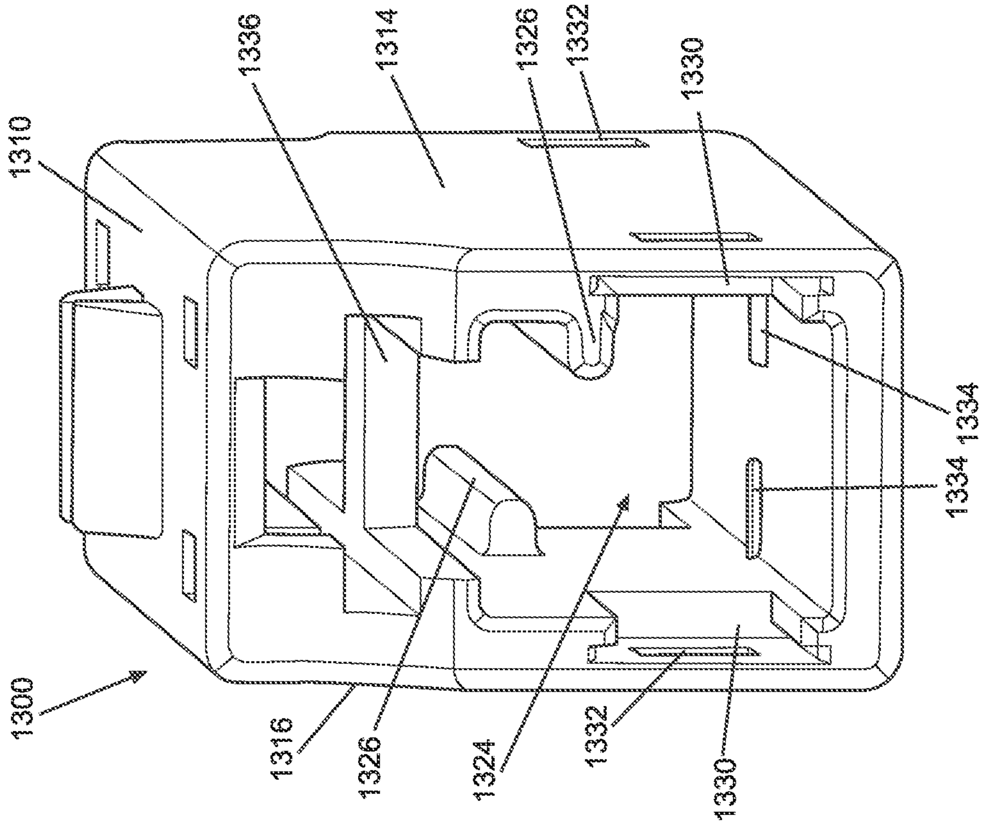

FIGS. 12A-12B illustrate an example embodiment of a high density panel 1200, which can be shielded or non-shielded, that supports a plurality of couplers 400. Each of the couplers 400 serves to electrically couple two free connectors 200. FIG. 12B illustrates the interface between the bosses 730/channel 732 of the metal shield 406 and a retaining element 1202 of a flex arm 1204 of the high density panel 1200 that retains the coupler 400 in a desired position within a coupler slot 1206.

FIGS. 13A-13D illustrate another example embodiment of a shielded coupler 1300. The coupler 1300 includes a singular metal housing 1302, four bonding shield contacts 1304 and a contact sub-assembly 1306.

The housing 1302, which is typically die cast, includes an upper face 1310 and a lower face 1312 connected by a first side face 1314 and a second side face 1316 that, together, define identical first and second end faces 1320, 1322. The first and second end faces 1320, 1322 surrounds a central cavity 1324 that extends the length of the coupler 1300. In certain embodiments, a projection 1326 projects from one, or more, of the faces 1314, 1316, 1320, 1322 into the central cavity 1324 to align a connector 200 for insertion and/or prevent a non-compatible connector from being inserted therein. Each of the first and second end faces 1320, 1322 further defines a recessed notch 1328 that is configured to interface with and retain the cantilevered latch 230 of the connector 200. The upper face 1310 of the housing includes first and second bosses 1327 that extend away from the upper face and oppose one another to define a channel 1329 there between.

The interior of each of the first and second side faces 1314, 1316 includes two recesses 1330, e.g. a total of four recesses 1330, each of which receives one of the four bonding shield contacts 1304, which are press fit therein. Proximate each of the recesses 1330 is an opening 1332 that extends through the respective side face 1314, 1316. Each of the openings 1332 interfaces with an outward extending prong 1418 (see FIG. 14B) of the bonding shield contact 1304 to assist in maintaining the position of the bonding shield contact 1304 relative to the housing 1302. An interior surface of the lower face 1312 includes first and second ramped projections 1334 (e.g., ramped in opposite directions) that interface with the contact sub-assembly 1306 to assist in maintaining the contact sub-assembly 1306 in a central position within the central cavity 1324. A cross-component 1336 extends between the interior surfaces of the first and second side walls 1314, 1316 and presents corresponding first and second ramped projections 1338 (see FIG. 16A) that are ramped in opposite directions (and are ramped in opposite direction to the projection 1334 immediately below). Projections 1338 also interface with the contact sub-assembly 1306 to assist in maintaining the contact sub-assembly 1306 in a central position within the central cavity 1324.

Figure 14A:
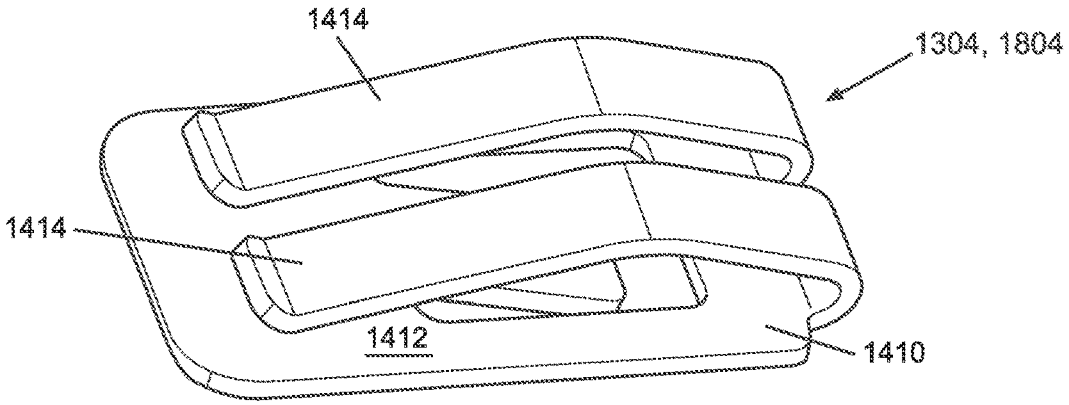
FIGS. 14A-14C illustrate an embodiment of a bonding shield contact of the coupler of FIGS. 13A-13D including a top perspective, bottom perspective and side view of the bonding shield contact.
Figure 14B:
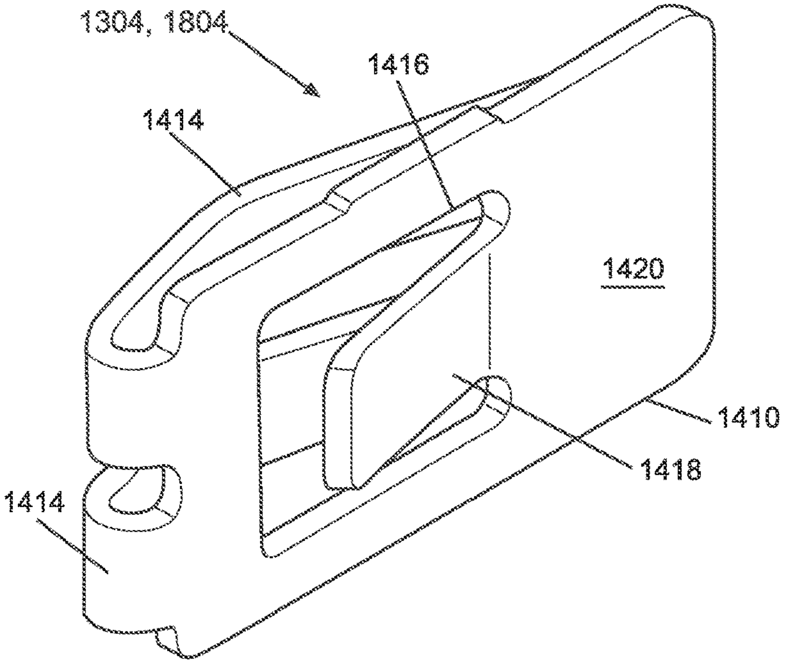
Figure 14C:
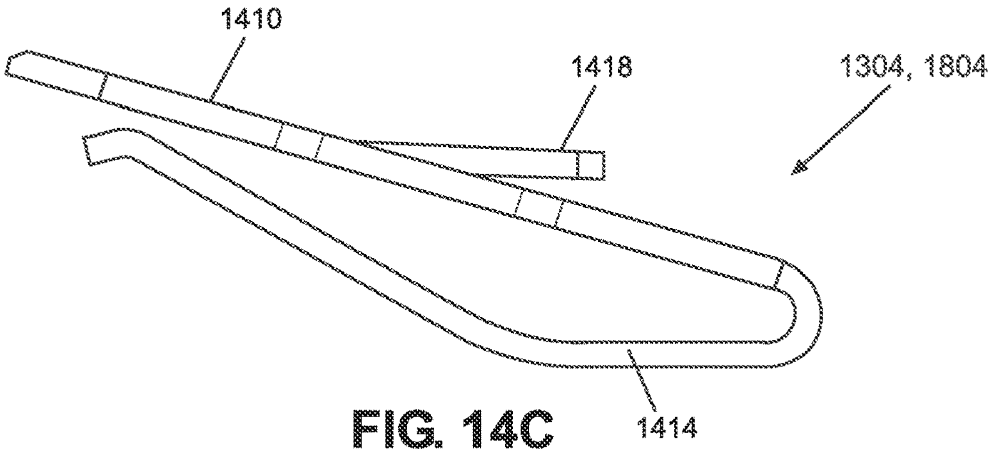

Further details of the metal bonding shield contacts 1304 can be appreciated with respect to FIGS. 14A-14C. As shown, each of the bonding shield contacts 1304 includes a base plate 1410 from which extend a pair of flex arms 1414 and fold over an upper surface 1412 of the base plate 1410. When in position within the housing 1302, one or both of metal flex arms 1414 will contact one of the metal flex tabs 242 of the metal frame 202 of the free connector 200 (see FIG. 2B) that is received within the housing 1302. An opening 1416 in the base plate 1410 accommodates a prong 1418 that extends outward and away from a bottom surface 1420 of the base plate 1410. The prong 1418 interfaces with the respective opening 1332 in the side faces 1314, 1316 to assist in maintaining the position of the bonding shield contact 1304.

Figure 15A:
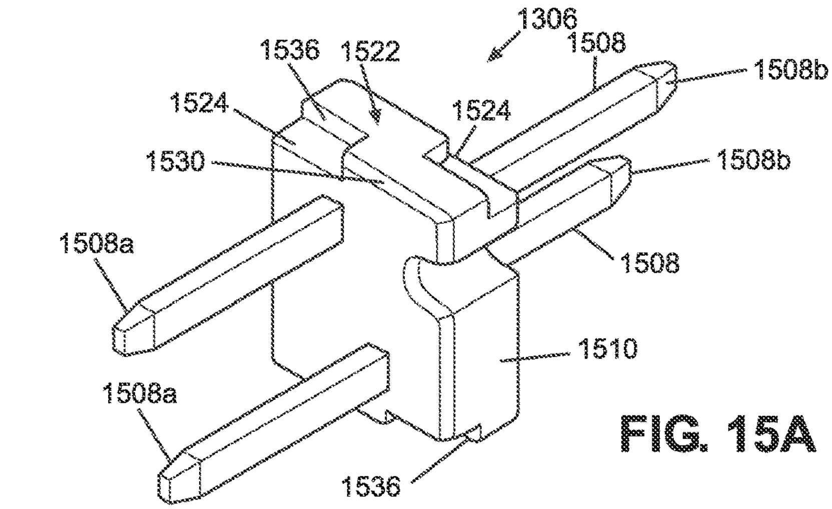
FIGS. 15A-15C provide perspective views of an embodiment of a contact sub-assembly of the coupler of FIGS. 13A-13D.
Figure 15B:
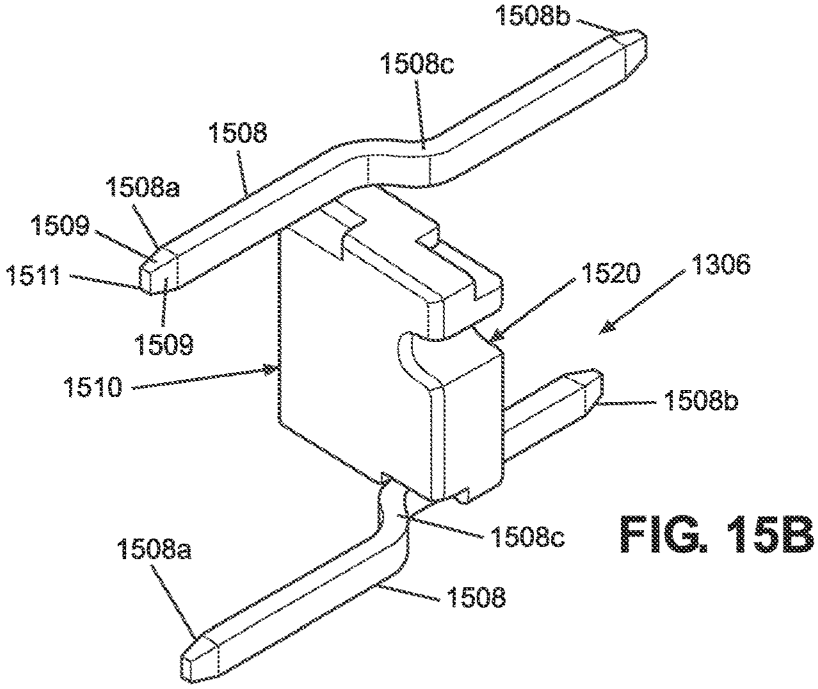
Figure 15C:
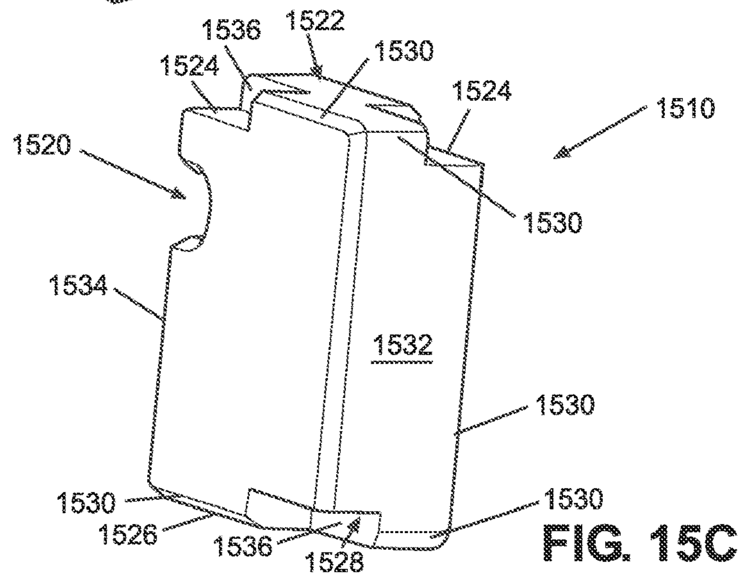

Further details of the contact sub-assembly 1306 can be appreciated with respect to FIGS. 15A-15C. As shown, the sub-assembly 1306 includes a pair of contacts 1508, similar to contacts 408 (see FIG. 8), overmolded with a block 1510. As with contacts 408, each of contacts 1508 includes a forward contact 1508*a*, a rearward contact 1508*b*, and a central portion 1508*c*. Each of the forward and rearward contacts 1508*a*, 1508*b* are pin contacts having a square or rectangular cross-section wherein the end of the pin includes four tapered faces 1509 that form a four-sided pyramid shape with a flattened apex 1511. In certain embodiments, the pins are of a rounded configuration. Notably the contacts 1508 are offset from one another to help prevent alien crosstalk between couplers 1300 and connectors 200 in high density applications. Further, the forward contacts 1508*a* are configured in a cross-over configuration to maintain polarity between the two connectors 200 when electrically coupled with the contacts 1508.

The block 1510 of the contact sub-assembly 1306 includes a side channel 1520 to accommodate the projection 1326 within the central cavity 1324 of the housing 1302. An upper face 1522 of the block 1510 includes recessed first and second corners 1524 that are positioned diagonal to one another. A lower face 1526 of the block 1510 includes first and second recessed corner 1528 that are positioned diagonal to one another and are opposite corners to first and second corners 1524. Edges 1530 surrounding each of the upper face 1522 and lower face 1526, as well as side walls 1532, 1534, of the block 1510 are beveled for easier insertion of the sub-assembly 1306 within the housing 1302 of the coupler 1300. The block 1510, when inserted within the housing 1302, is slid past the ramped projections 1334, 1338 of the housing 1302 into a central position whereby the ramped projections 1334, 338 interface with a wall 1536 that defines that defines each of the recessed corners 1524, 1528.

Figure 16A:
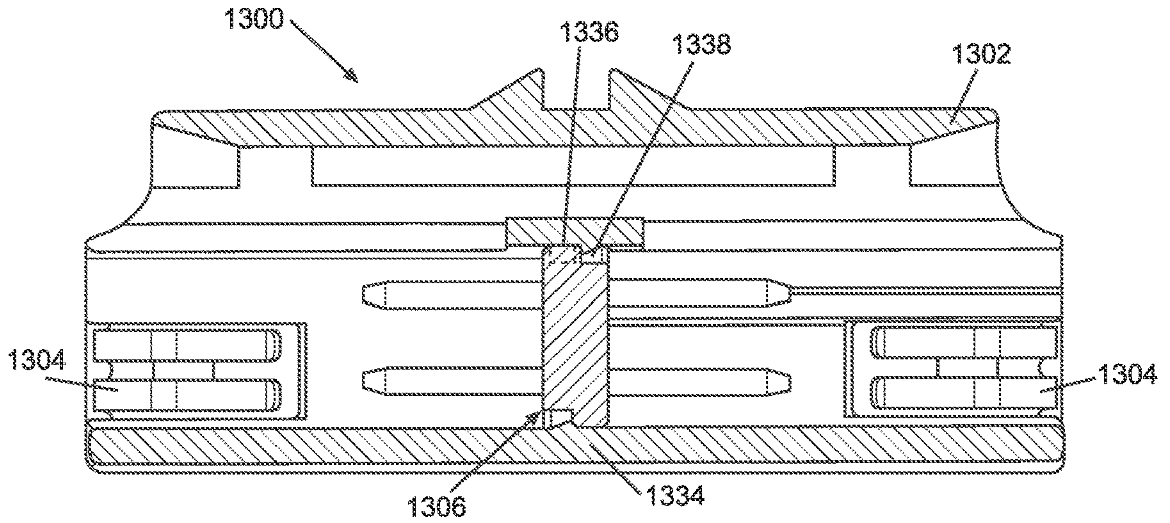
FIGS. 16A-16B are cross-sectional views of the coupler of FIGS. 13A-13D taken along lines 16A-16A and 16B-16B of FIG. 17, respectively.
Figure 16B:
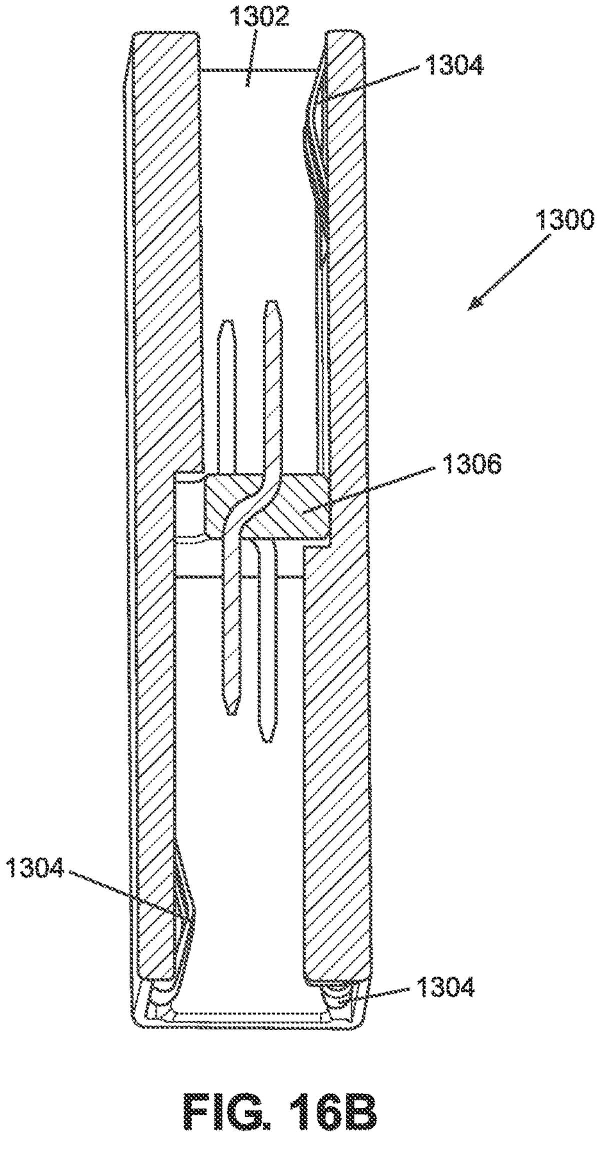
Figure 17:
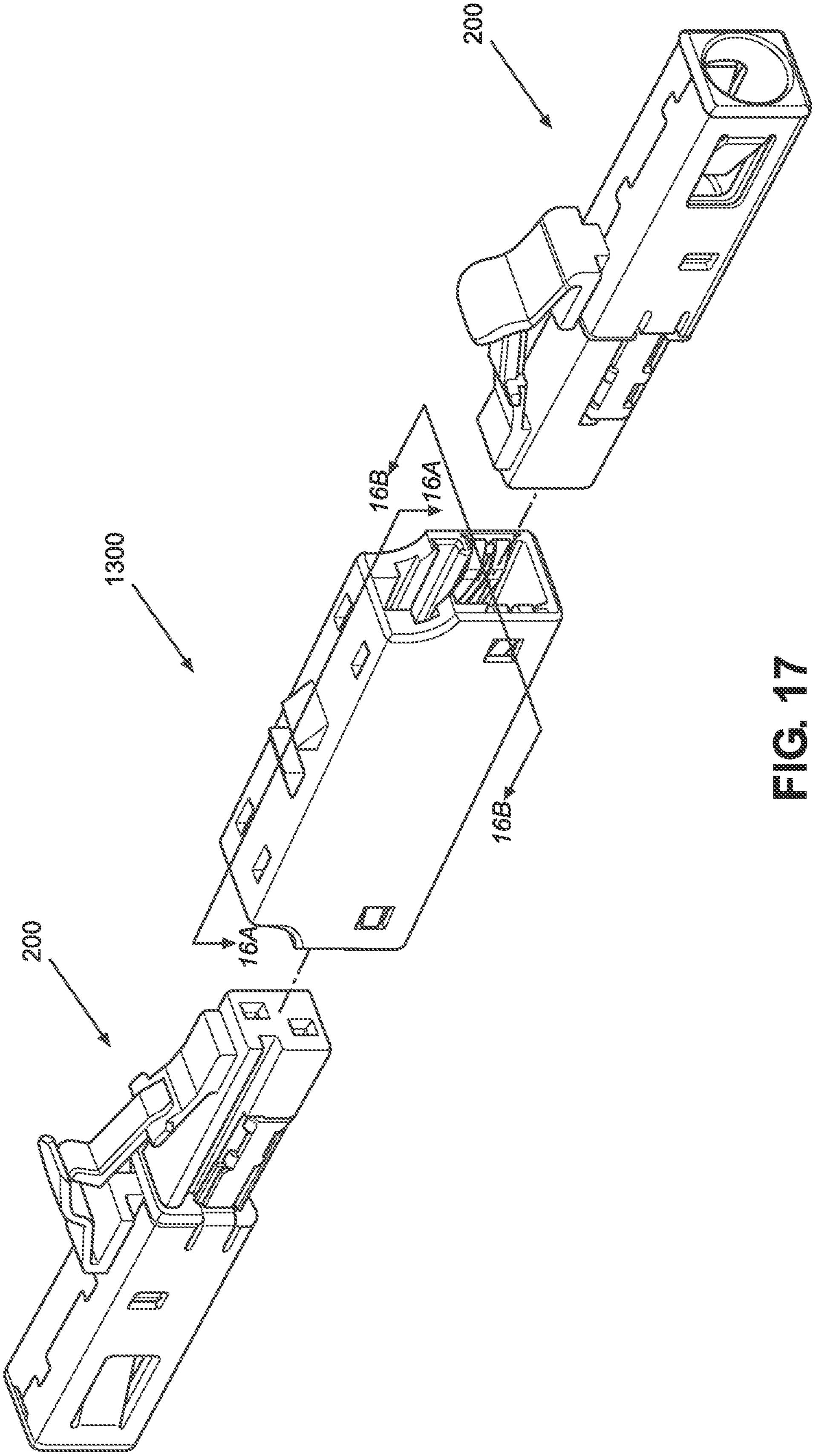
FIG. 17 is a perspective view of the coupler of FIGS. 13A-13D receiving first and second free connectors of FIGS. 2A-2D.
Figure 18:
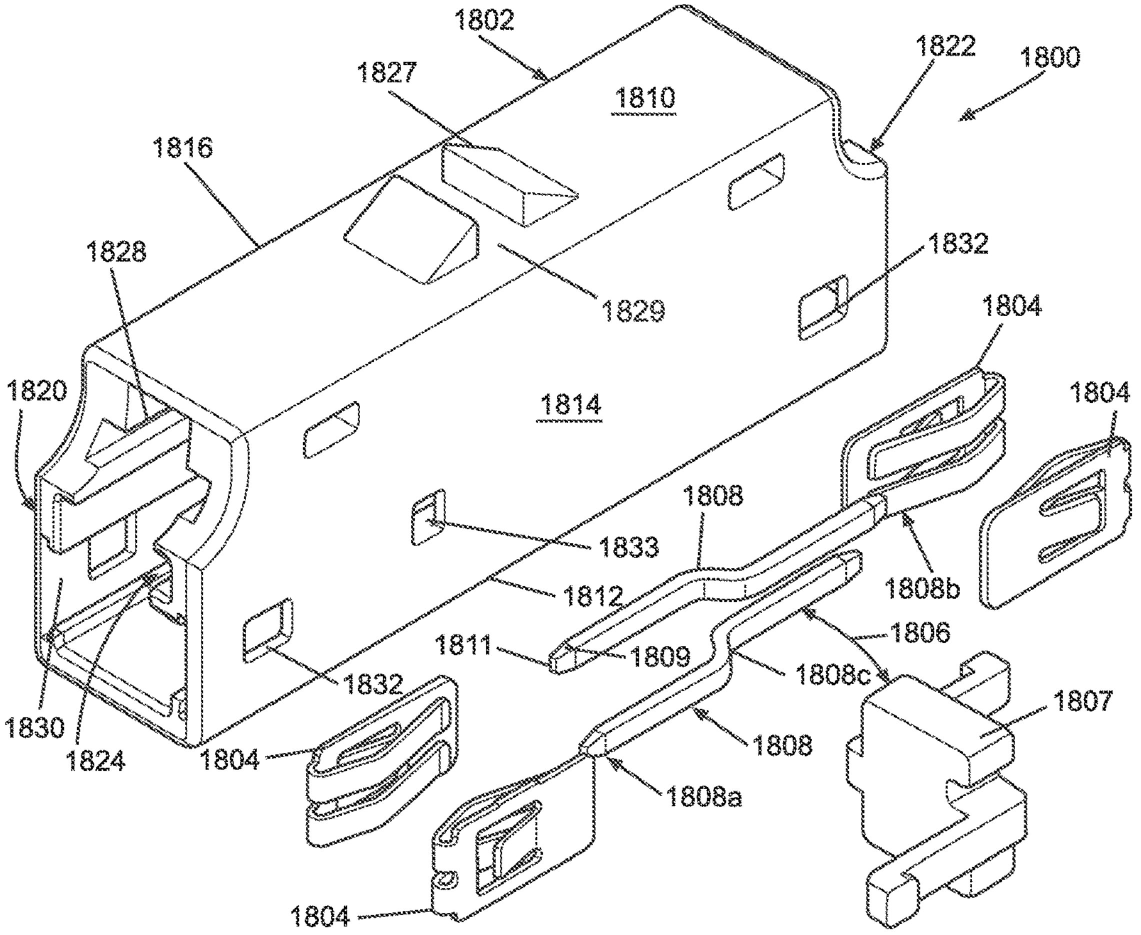
FIG. 18 illustrates an exploded perspective view of an embodiment of a coupler.
Figure 19:
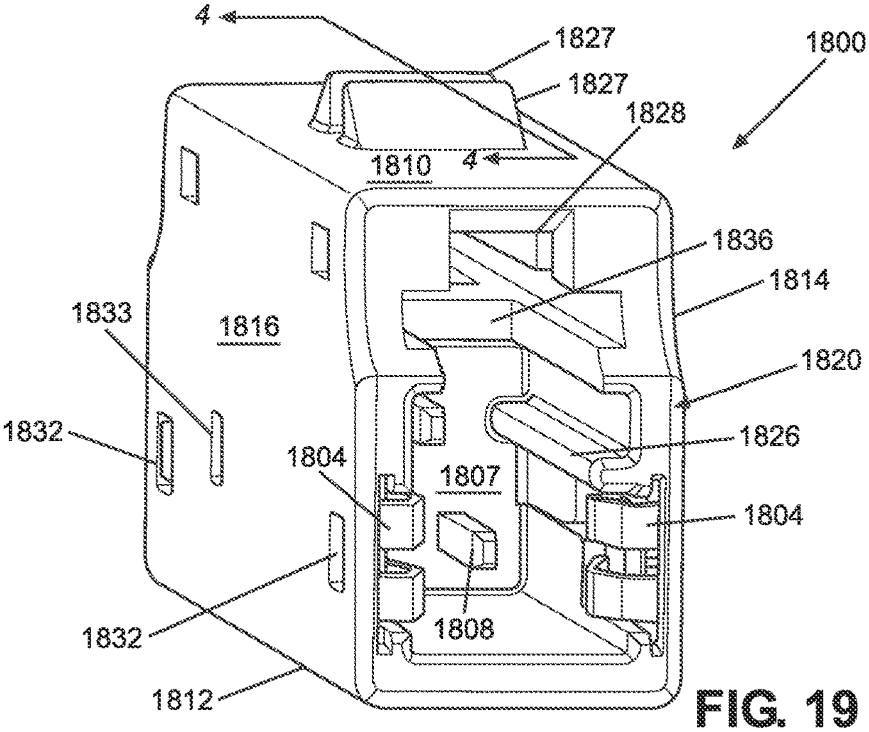
FIG. 19 is a perspective view coupler of FIG. 18 in an assembled configuration.
Figure 20:
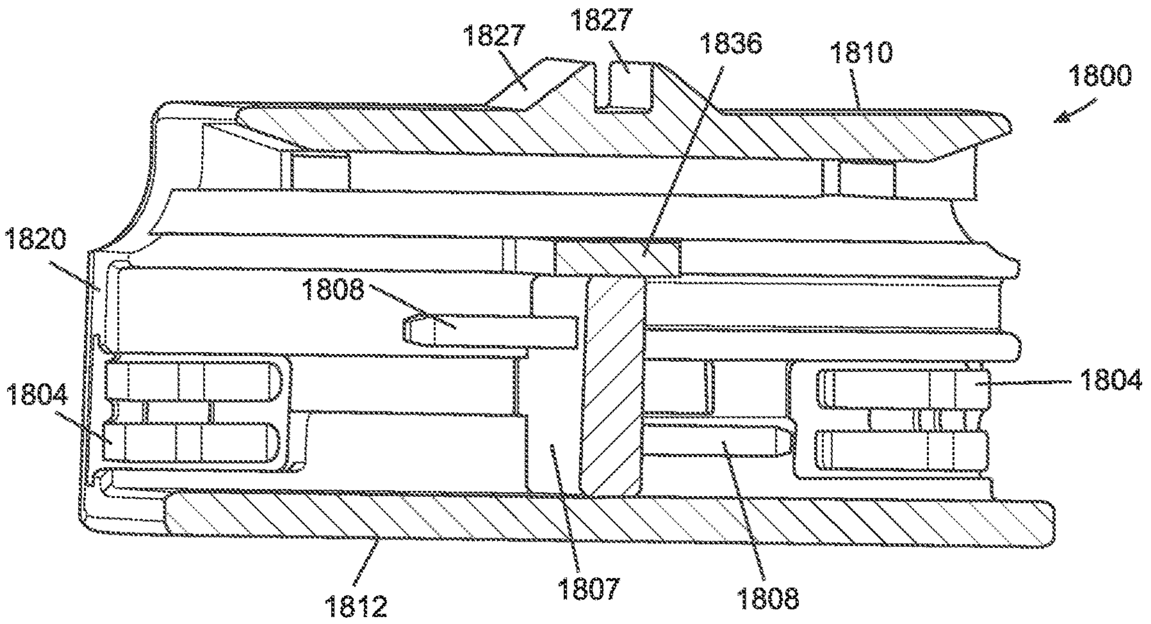
FIG. 20 is a cross-sectional view of the coupler of FIG. 19 taken along line A-A.

FIGS. 16A-16B provide a side cross-sectional view and top cross-sectional view taken along lines 16A-16A and 16B-16B of FIG. 17, respectively. Each cross-section illustrates the housing 1302, bonding shield contacts 1304 and contact sub-assembly relative to one another in a fully assembled coupler 1300. FIG. 17 illustrates the coupler 1300 receiving a first free connector 200 and a second free connector 200. As with coupler 400, a plurality of couplers 1300 can be utilized in a high density panel 1200 (see FIGS. 12A-12B).

FIGS. 18, 19, 20 and 21A-21B illustrate another example embodiment of a coupler 1800 in a shielded configuration. The coupler 1800 includes a singular metal housing 1802, four bonding shield contacts 1804 and a contact sub-assembly 1806 that includes a body 1807 and a single pair of contacts 1808.

The housing 1802, which is die cast in a symmetrical configuration, includes an upper face 1810 and a lower face 1812 connected by a first side face 1814 and a second side face 1816 that, together, define identical first and second end faces 1820, 1822. The first and second faces 1820, 1822 surround a central cavity 1824 that extends the length of the coupler 1800 between first and second end face 1820, 1822. In certain embodiments, a projection 1826 projects from one, or more, of the faces 1814, 1816, 1820, 1822 into the central cavity 1824 to align a connector 200 for insertion and/or prevent a non-compatible connector from being inserted therein. Each of the first and second end faces 1820, 1822 further defines a recessed notch 1828 that is configured to interface with and retain the cantilevered latch 230 of the connector 200. The upper face 1810 of the housing includes first and second bosses 1827 that extend away from the upper face and oppose one another to define a channel 1829 there between.

The interior of each of the first and second side faces 1814, 1816 includes two recesses 1830, e.g. a total of four recesses 1830, each of which receives one of the four bonding shield contacts 1804, which are press fit therein. Proximate each of the recesses 1830 is an opening 1832 that extends through the respective side face 1814, 1816. Each of the openings 1832 interfaces with an outward extending prong 1418 (see FIG. 14B) of the bonding shield contact 1804 to assist in maintaining the position of the bonding shield contact 1804 relative to the housing 1802. Additional details regarding the bonding shield contacts 1804 can be found with reference to FIGS. 14A-14C. Each of the side faces 1814, 1816 additionally includes an opening 1833 to interface with the contact sub-assembly 1806.

As previously noted, the contact sub-assembly 1806 includes pair of contacts 1808, which generally correspond to contacts 408 (see FIG. 8). As with contacts 408, each of contacts 1808 (see FIG. 18) includes a forward contact 1808*a*, a rearward contact 1808*b*, and a central portion 1808*c*. Each of the forward and rearward contacts 1808*a*, 1808*b* are pin contacts having a square or rectangular cross-section wherein the end of the pin includes four tapered faces 1809 that form a four-sided pyramid shape with a flattened apex 1811. In certain embodiments, the pins are of a rounded configuration. Notably the contacts 1808 are offset from one another to help prevent alien crosstalk between couplers 1800 and connectors 200 in high density applications. Further, the forward contacts 1808*a* are configured in a cross-over configuration to maintain polarity between the two connectors 200 when electrically coupled with the contacts 1808.

Figure 21A:
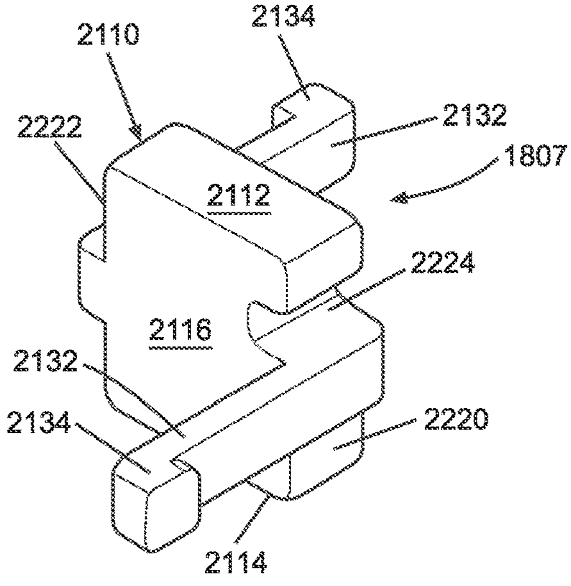
FIGS. 21A-21B are perspective views of a body portion of a contact sub-assembly.
Figure 21B:
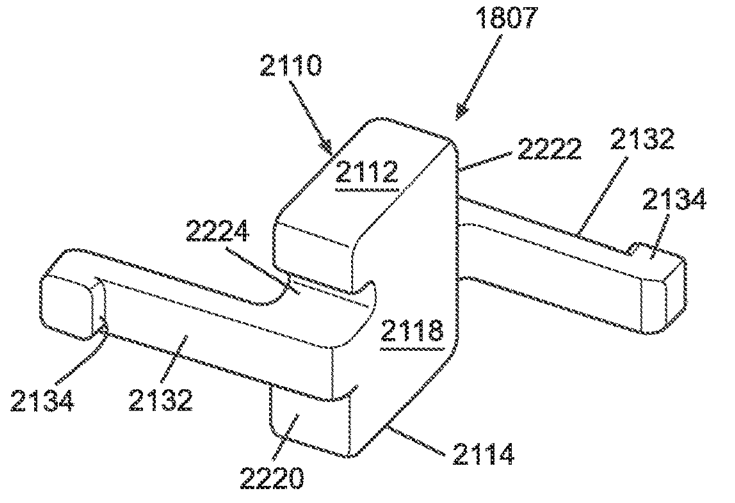

Further details of the body 1807 of the contact sub-assembly 1806 can be appreciated with respect to FIGS. 21A-21B. As shown, the symmetrical body 1807 of the contact sub-assembly 1806 includes a central block portion 2110 that includes an upper face 2112 opposing a lower face 2114 with the upper and lower faces 2112, 2114 connected by first and second broad side faces 2116, 2118 and by first and second narrow side faces 2220, 2222. The first narrow side face 2220 incorporates a channel 2224 to accommodate the projection 1826 within the central cavity 1824 of the housing 1802. All edges 2130 of the plurality of faces 2110-2222 of the central block portion 2110 are beveled for easier insertion of the sub-assembly 1806 within the housing 1802 of the coupler 1800. First and second latch arms 2132, extend from the approximate center of each of first and second narrow side faces 2220, 2222, with each of the first and second latch arms 2132 including a corresponding lip edge 2134 to interface with opening 1833 in a respective one of the first and second side walls 1814, 1816 of the housing 1802 of the coupler 1800. Each of the latch arms 2132 flexes relative to the central block portion 2110 of the body 1807 to enable insertion of the contact sub-assembly 1806 whereby the interfacing of the lip edge 2134 and coupler opening 1833 removably retains the contact sub-assembly 1806 within the coupler 1800. The symmetrical configuration of the body 1807 of the contact sub-assembly 1806, along with symmetrical configuration of the coupler housing 1802, enables the contact sub-assembly 1806 to be inserted into the housing 1802 via either the first end face 1820 or the second end face 1822 of the housing 1802.

In order to ensure shielding properties of the coupler 1800, the housing 1802 of the coupler 1800 is preferably die cast metal (e.g., a zinc alloy) to provide shielding, grounding and bonding paths with bonding shield contacts 1804 and connectors 200 received via the first and second end faces 1820, 1822 of the housing 1802 of the coupler 1800. The single pair of contacts 1808 provide a signal and/or power path from a first connector 200 to a second connector 200 that are received within the coupler 1800. The single pair of contacts 1808 are held in position by the central block portion 2110 of the body 1807 of the contact sub-assembly 1806.

Figure 22:
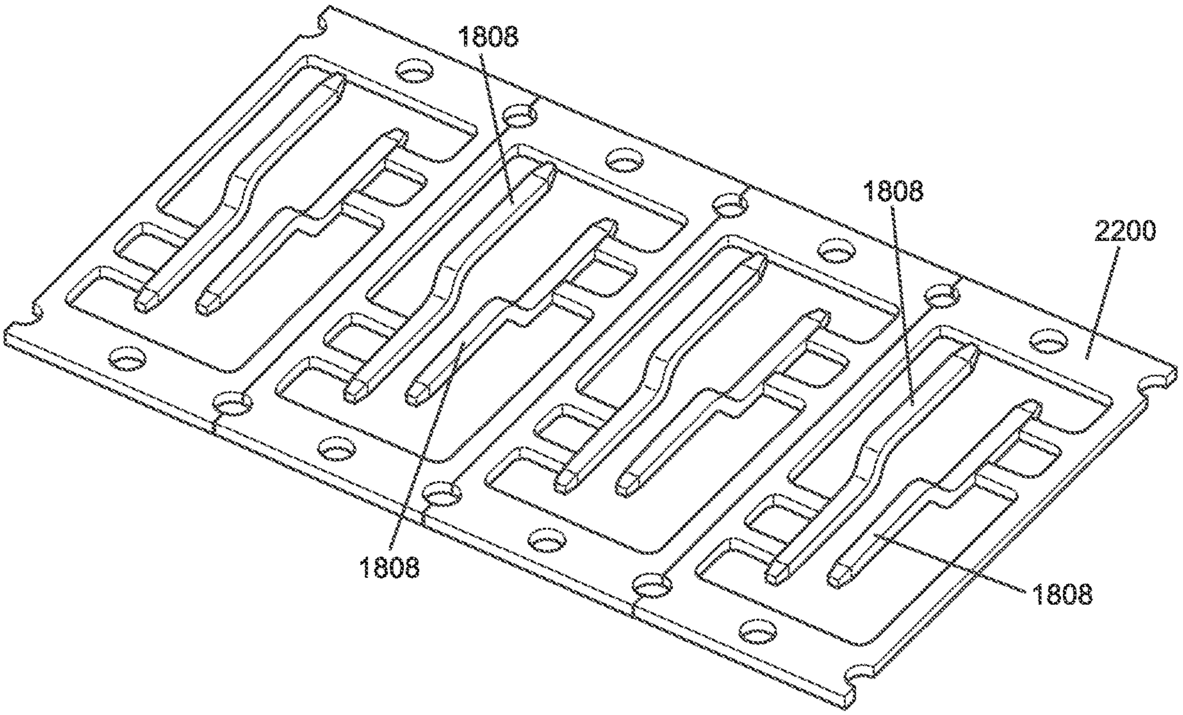
FIGS. 22-23 illustrate steps in manufacturing a contact sub-assembly.
Figure 23:
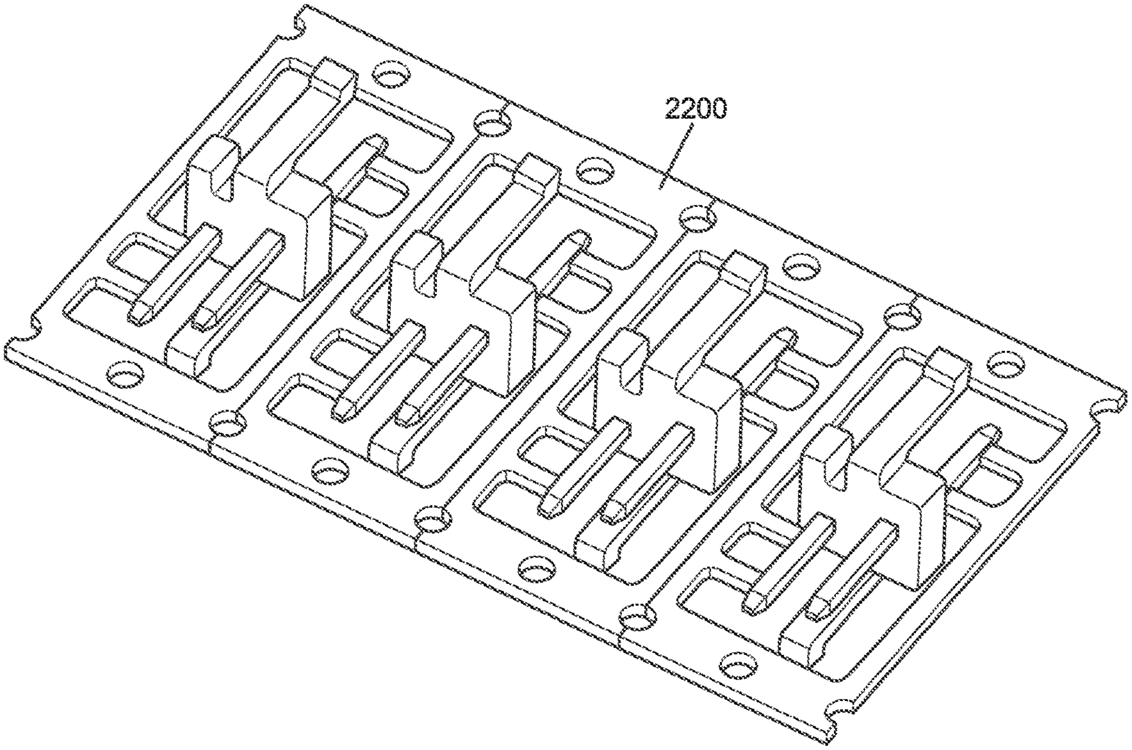

FIGS. 22-23 illustrate an example of a method of manufacture of the contact sub-assembly 1806 using a carrier strip 2200. Per FIG. 22, each section of the carrier strip 2200 is progressively die stamped to form the pair of contacts 1808. Subsequently, per FIG. 23, each of section of the carrier strip 2200 is subjected to injection overmolding (using, for example, a plastic or other moldable material) to form the body 1807 of the contact sub-assembly 1806 about the contacts 1808. The contact sub-assembly 1806 can then be removed from each respective section of the carrier strip 2200 and inserted into the housing 1802 of the coupler 1800.

As with the other coupler embodiments disclosed herein, the shielded coupler 1800 can also be manufactured in an unshielded configuration by eliminating the bonding shield contacts 1804 and manufacturing the housing from a non-conductive material (e.g. a plastic).

It will be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to disclose the invention to those skilled in this art. Note that features of one or more embodiments can be incorporated in other embodiments without departing from the spirit of the invention, for example, receptacle contacts can be replaced with pin contacts and, correspondingly, pin contacts can be replaced by receptacle contacts in the various connector and coupler configurations. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Spatially relative terms, such as “under”, “below”, “lower”, “over”, “upper”, “top”, “bottom” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression “and/or” includes any and all combinations of one or more of the associated listed items.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises”, “comprising”, “includes” and/or “including” when used in this specification, specify the presence of stated features, operations, elements, and/or components, but do not preclude the presence or addition of one or more other features, operations, elements, components, and/or groups thereof.

Herein, the terms “attached”, “connected”, “interconnected”, “contacting”, “mounted” and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A coupler, comprising:

a metal housing having a first end that receives a first connector and a second end that receives a second connector; and exactly one pair of coupling contacts comprising a first coupling contact and a second coupling contact, each of the first and second coupling contacts contained within the metal housing and each of the first and second coupling contacts electrically coupling the first connector with the second connector while maintaining electrical polarity;

wherein the exactly one pair of coupling contacts is centrally supported by a block that is centrally positioned within the metal housing.

2. The coupler of claim 1, wherein the first and second coupling contacts comprise pin contacts having a square or rectangular cross section.

3. The coupler of claim 2, wherein each of the first and second coupling contacts have tapered faces that meet at a flattened apex.

4. The coupler of claim 1, wherein the first coupling contact crosses over the second coupling contact to maintain electrical polarity.

5. The coupler of claim 1, further comprising:

a first housing defining a first central cavity, the first housing contained by the metal housing and positioned at the first end of the metal housing;

a second housing defining a second central cavity, the second housing contained by the metal housing and positioned at the second end of the metal housing, the second housing being mechanically coupled to the first housing.

6. The coupler of claim 5, wherein each of the coupling contacts extends between the first and second central cavities through a respective channel in each of the first and second housings.

7. The coupler of claim 5, wherein each of the first and second ends of the metal housing includes a pair of opposing metal flex tabs.

8. The coupler of claim 7, wherein the pairs of opposing flex tabs extend through openings in the respective first and second housings into the respective first and second central cavities to contact, respectively, a first metal frame of the first connector and a second metal frame of the second connector.

9. The coupler of claim 1, wherein the block includes upper and lower opposing recessed corners and wherein each of the upper recessed corners interfaces with a ramped projection projecting from an interior surface of the metal housing.

10. The coupler of claim 1, wherein the metal housing includes a first pair of opposing bonding contacts at the first end and a second pair of opposing bonding contacts at the second end.

11. The coupler of claim 10, wherein each contact of the first and second pairs of bonding contacts are individually retained within a recess in an interior surface of the metal housing.

12. The coupler of claim 10, wherein each contact of the first pair of bonding contacts includes a metal flex arm that interfaces with a first metal frame of the first connector when the first connector is received within the metal housing and wherein each contact of the second pair of bonding contacts includes a metal flex arm that interfaces with a second metal frame of the second connector when the second connector is received within the metal housing.

13. The coupler of claim 10, wherein each contact of the first and second pairs of bonding contacts includes an outward extending prong that interfaces with a respective opening in the metal housing.

14. The coupler of claim 1, wherein the first connector has exactly two contacts comprising a first contact and a second contact, the first contact coupled to a first electrical conductor and the second contact coupled to a second electrical conductor, and wherein the second connector has exactly two contacts comprising a third contact and a fourth contact, the third contact coupled to a third electrical conductor and the fourth contact coupled to a fourth electrical conductor, wherein the first coupling contact electrically couples the first contact of the first connector with the third contact of the second connector while maintaining electrical polarity, and wherein the second coupling contact electrically couples the second contact of the first connector with the fourth contact of the second connector while maintaining electrical polarity.

15. A plurality of the couplers of claim 1, wherein the plurality of couplers are maintained in a high density connector panel.

16. The plurality of couplers of claim 15, wherein each of the first and second connectors, the plurality of couplers, and the high density connector panel are shielded.

17. The coupler of claim 1, wherein the block includes a channel that interfaces with a projection of the metal housing.

18. The coupler of claim 1, wherein the block includes a pair of latch arms that interface with openings in the metal housing to retain the block within the metal housing.

19. A coupler comprising:

a housing including a channel having openings at a first end and a second end of the housing, the first end receiving a first connector and the second end receiving a second connector, the first connector having a first pair of contacts and the second connector having a second pair of contacts; and a contact sub-assembly including exactly one pair of coupler contacts and a body portion supporting the exactly one pair of coupler contacts, the contact sub-assembly being positioned centrally within the housing and the exactly one pair of coupler contacts electrically coupling the first pair of contacts with the second pair of contacts;

wherein the contact sub-assembly includes a pair of latch arms that interface with openings in the housing to retain the contact sub-assembly within the housing.

20. The coupler of claim 19, wherein the housing comprises a shielded housing and wherein the coupler further comprises a plurality of bonding shield contacts, each of the plurality of bonding shield contacts interfacing with the shielded housing and each of the plurality of bonding shield contacts interfacing with at least one of the first and second connectors received at the housing.

* * * * *